US008811725B2

(12) United States Patent
Yokono et al.

(10) Patent No.: US 8,811,725 B2
(45) Date of Patent: Aug. 19, 2014

(54) LEARNING DEVICE, LEARNING METHOD, IDENTIFICATION DEVICE, IDENTIFICATION METHOD, AND PROGRAM

(75) Inventors: Jun Yokono, Tokyo (JP); Atsushi Okubo, Tokyo (JP)

(73) Assignee: Sony Corporation, Tokyo (JP)

( * ) Notice: Subject to any disclaimer, the term of this patent is extended or adjusted under 35 U.S.C. 154(b) by 307 days.

(21) Appl. No.: 13/237,173

(22) Filed: Sep. 20, 2011

(65) Prior Publication Data
US 2012/0087574 A1 Apr. 12, 2012

(30) Foreign Application Priority Data

Oct. 12, 2010 (JP) ................................. 2010-229368

(51) Int. Cl.
*G06K 9/62* (2006.01)
(52) U.S. Cl.
USPC ........................................................ 382/159
(58) Field of Classification Search
None
See application file for complete search history.

(56) References Cited

U.S. PATENT DOCUMENTS

| 8,254,645 | B2 * | 8/2012 | Okubo ........................ 382/118 |
| 2003/0108244 | A1 * | 6/2003 | Li et al. ........................ 382/227 |
| 2004/0013286 | A1 * | 1/2004 | Viola et al. .................... 382/118 |
| 2005/0271245 | A1 * | 12/2005 | Ai et al. ........................ 382/100 |
| 2008/0137917 | A1 | 6/2008 | Okubo et al. |
| 2008/0137956 | A1 * | 6/2008 | Yang et al. .................... 382/181 |
| 2008/0212832 | A1 * | 9/2008 | Otsuru et al. ................. 382/103 |
| 2009/0196467 | A1 * | 8/2009 | Okubo ........................... 382/118 |
| 2009/0324060 | A1 * | 12/2009 | Sato et al. ..................... 382/159 |
| 2010/0086175 | A1 * | 4/2010 | Yokono et al. ................ 382/103 |
| 2010/0086176 | A1 * | 4/2010 | Yokono et al. ................ 382/103 |

(Continued)

FOREIGN PATENT DOCUMENTS

JP  2008-165731  7/2008

OTHER PUBLICATIONS

Michael J. Jones, et al., "Face Recognition Using Boosted Local Features", IEEE International Conference on Computer Vision 2003, Apr. 2003.*

(Continued)

*Primary Examiner* — Atiba O Fitzpatrick
*Assistant Examiner* — Thomas A James
(74) *Attorney, Agent, or Firm* — Oblon, Spivak, McClelland, Maier & Neustadt, L.L.P.

(57) ABSTRACT

Provided is a learning device including: an acquisition section that acquires a plurality of image pairs in which the same subjects appear and a plurality of image pairs in which different subjects appear; a setting section that sets feature points on one image and the other image of each image pair; a selection section that selects a plurality of prescribed feature points, which are set at the same positions of the one image and the other image, so as to thereby select a feature extraction filter for each prescribed feature point; an extraction section that extracts the features of the prescribed feature points of each of the one image and the other image by using the plurality of feature extraction filters; a calculation section that calculates a correlation between the features; and a learning section that learns a same-subject classifier on the basis of the correlation and label information.

10 Claims, 17 Drawing Sheets

(56) References Cited

U.S. PATENT DOCUMENTS

| | | | |
|---|---|---|---|
| 2011/0075918 A1* | 3/2011 | Friedhoff et al. | 382/159 |
| 2011/0085728 A1* | 4/2011 | Gao et al. | 382/165 |
| 2011/0103694 A1* | 5/2011 | Nakano et al. | 382/190 |
| 2011/0103695 A1* | 5/2011 | Sato et al. | 382/190 |
| 2011/0135192 A1* | 6/2011 | Yokono | 382/160 |
| 2011/0170781 A1* | 7/2011 | Bronstein et al. | 382/190 |
| 2011/0188713 A1* | 8/2011 | Chin et al. | 382/118 |
| 2011/0293173 A1* | 12/2011 | Porikli et al. | 382/159 |
| 2012/0051651 A1* | 3/2012 | Yamaoka et al. | 382/195 |

OTHER PUBLICATIONS

Rainer Lienhart, et al., "Empirical Analysis of Detection Cascades of Boosted Classifiers for Rapid Object Detection", DAGM'03, 25th Pattern Recognition Symposium, Sep. 2003.*

Michael J. Jones, et al., "Face Recognition Using Boosted Local Features", IEEE International Conference on Computer Vision 2003, Apr. 2003, 10 Pages.

Peng Yang, et al., "Face Recognition Using Ada-Boosted Gabor Features", IEEE International Conference on Automatic Face and Gesture Recognition, May 2004, 6 Pages.

* cited by examiner

FIG. 1
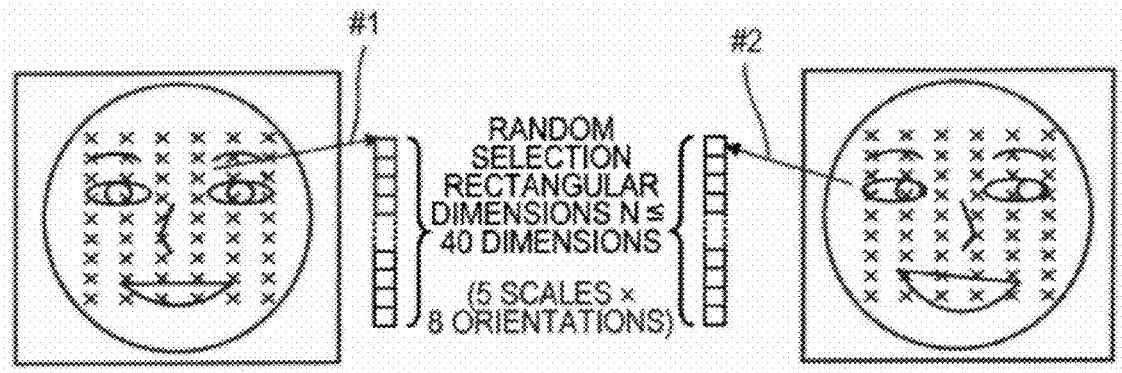
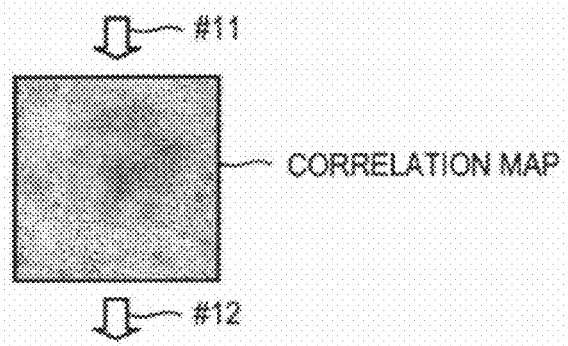
FIG. 2
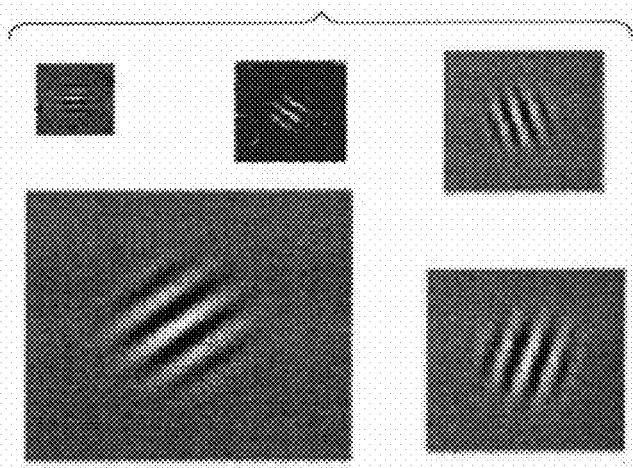

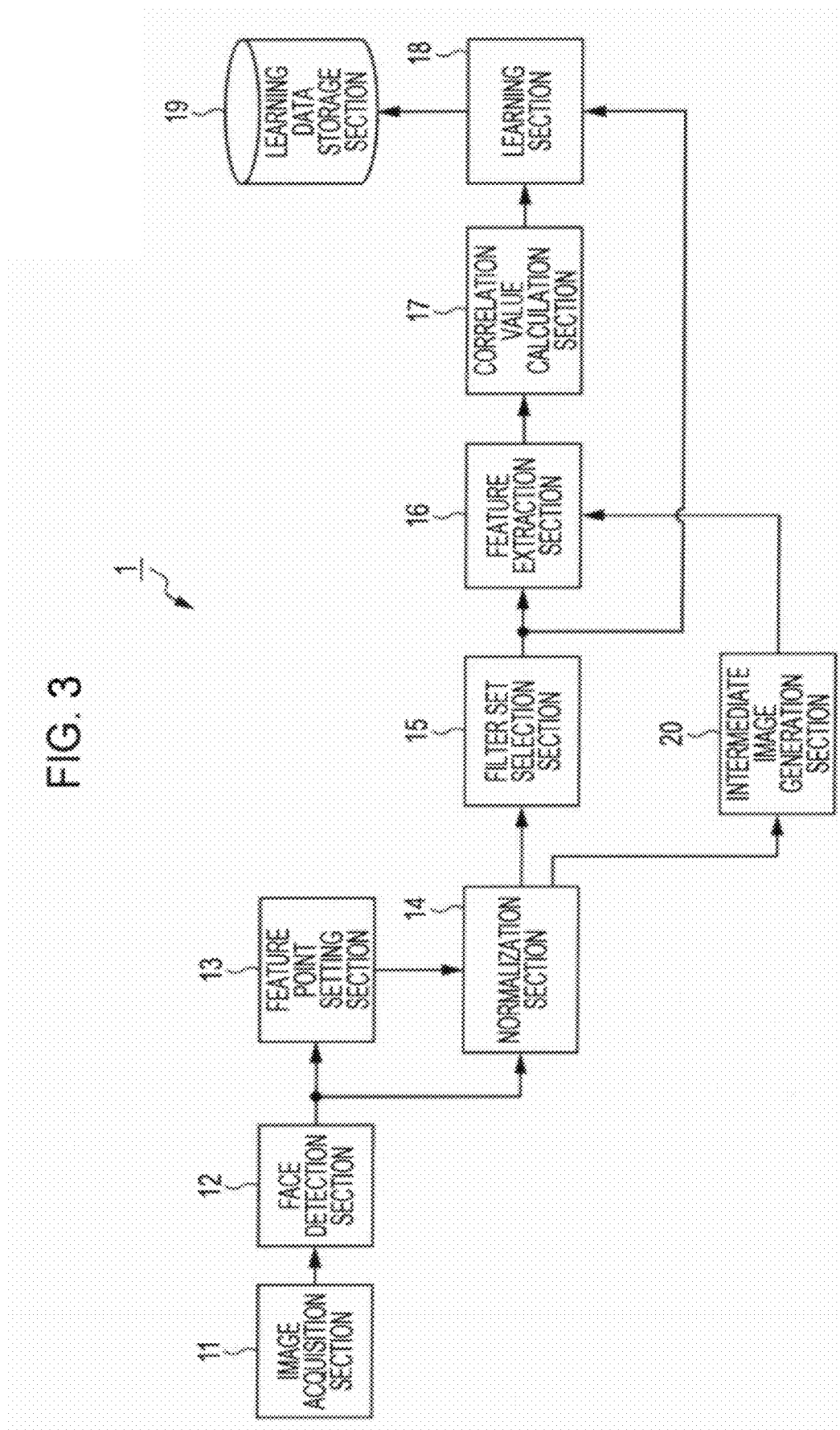

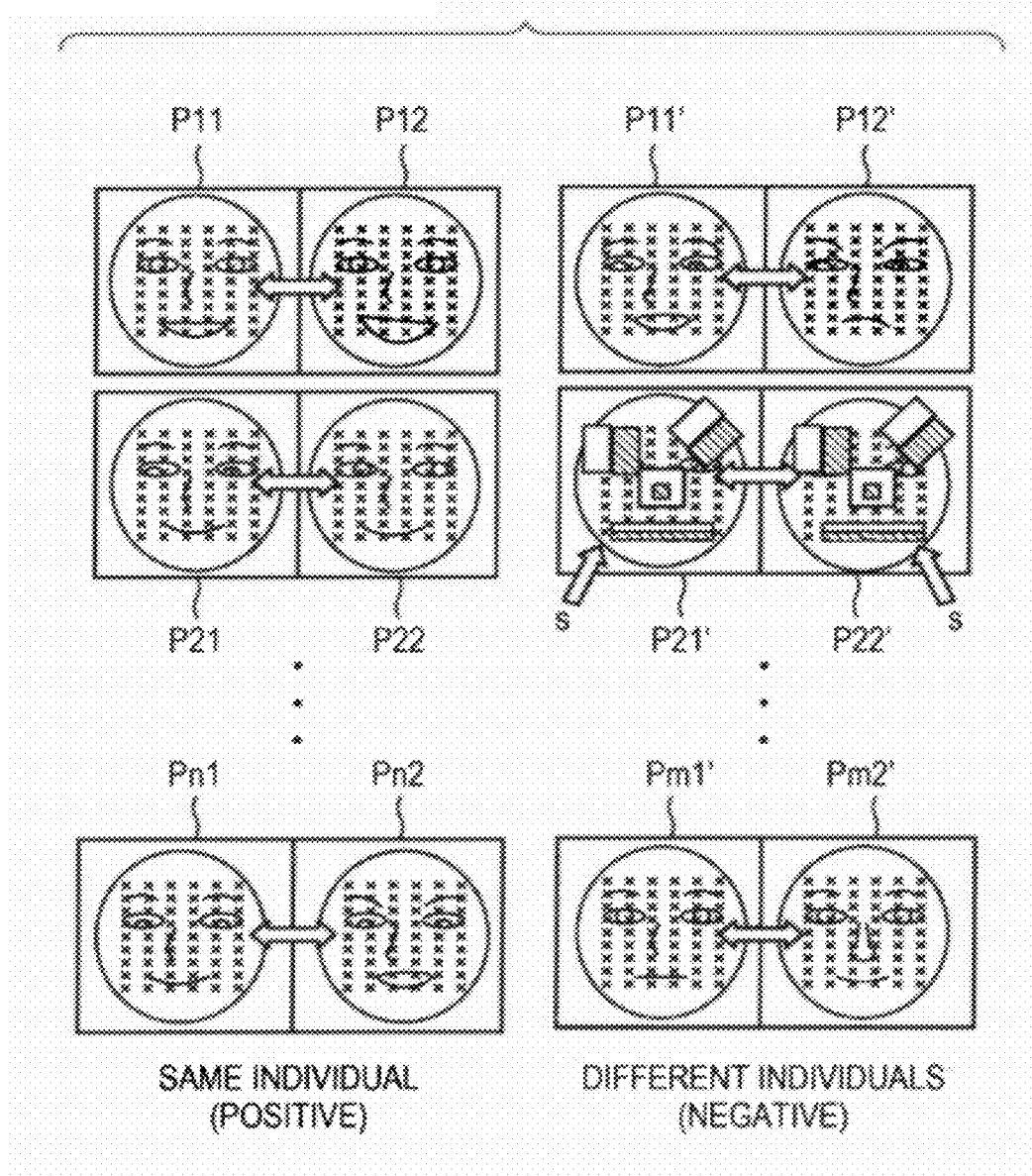

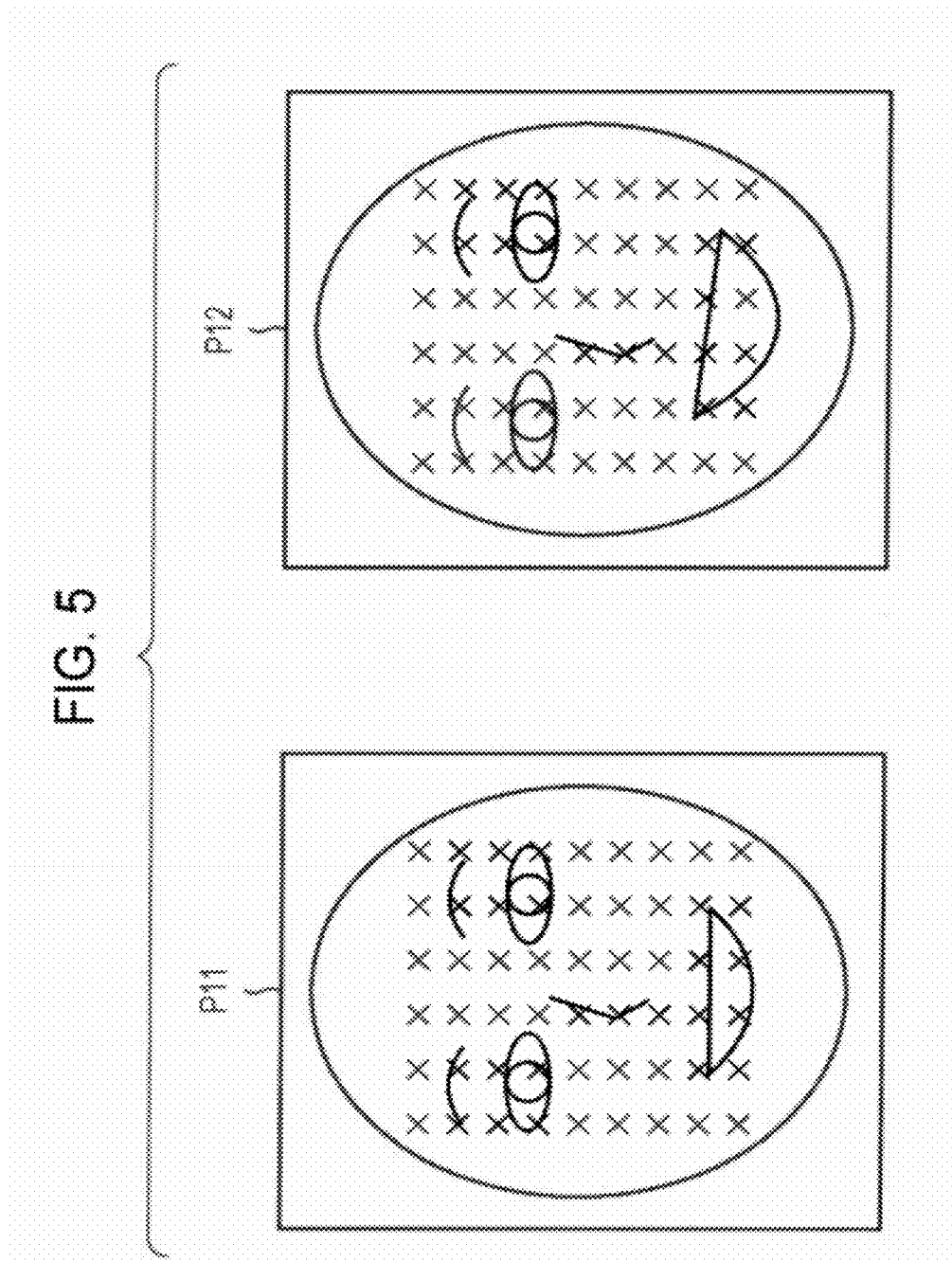

FIG. 7

$s1 = [ (r_1, p_{13}), (r_5, p_{51}), (r_3, p_{23}), \cdots, (r_8, p_{43}) ]$ $s2 = [ (r_3, p_{33}), (r_5, p_{62}), (r_1, p_{63}), \cdots, (r_7, p_{36}) ]$ $\vdots$ $sn = [ (r_4, p_{41}), (r_2, p_{69}), (r_5, p_{29}), \cdots, (r_2, p_{23}) ]$

FIG. 8

CORRELATION $\begin{cases} V1 = [r_1 \cdot f_{13}, r_5 \cdot f_{51}, r_3 \cdot f_{23}, \cdots, r_8 \cdot f_{43}] \\ V1' = [r_1 \cdot f_{13}', r_5 \cdot f_{51}', r_3 \cdot f_{23}', \cdots, r_8 \cdot f_{43}'] \end{cases}$

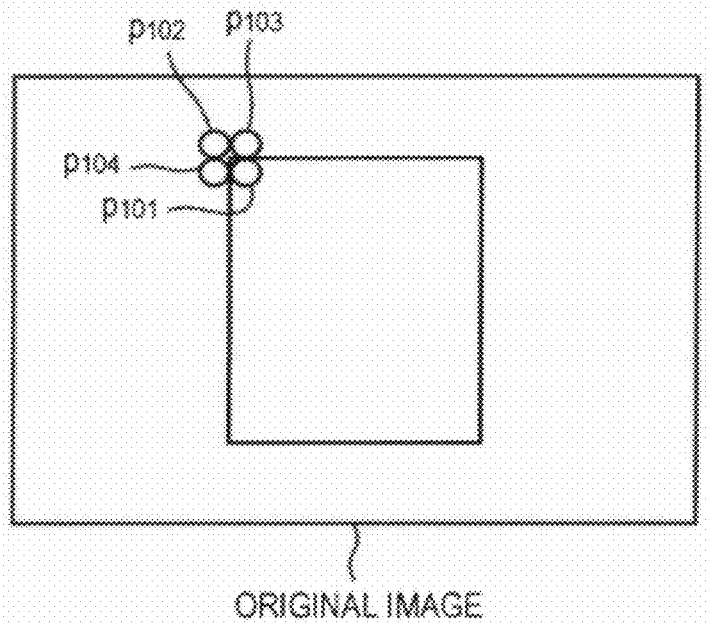
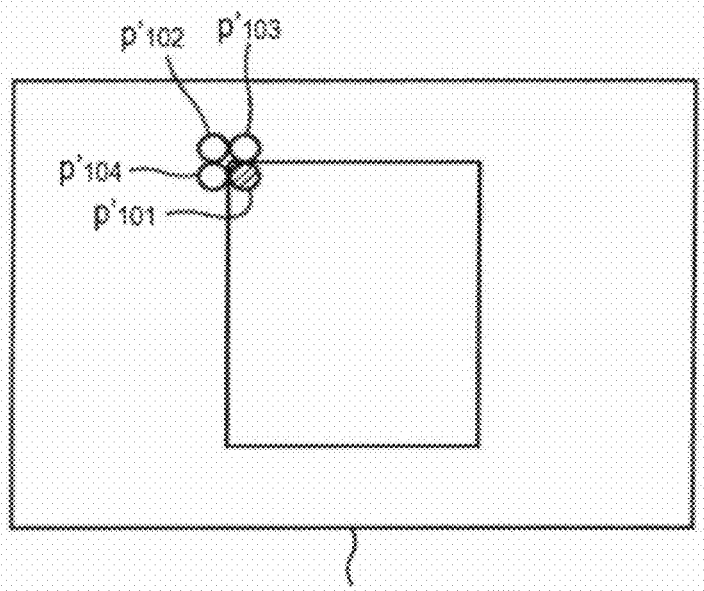

FIG. 14
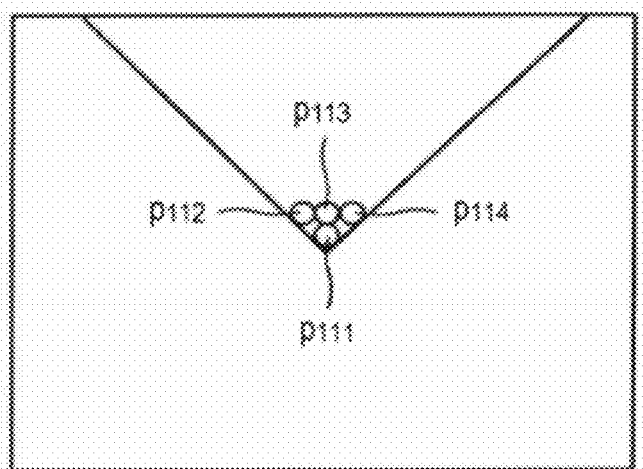
ORIGINAL IMAGE
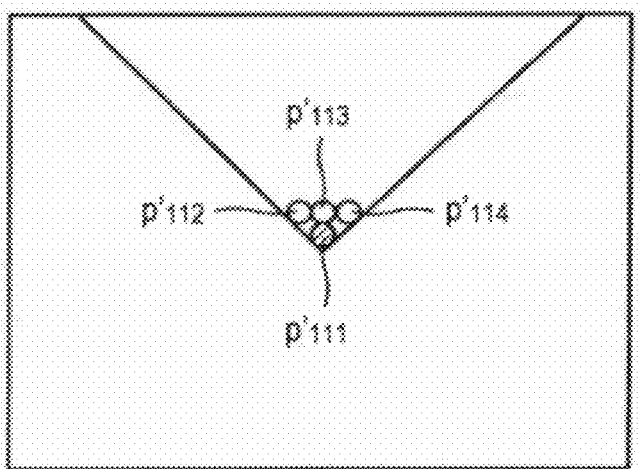
INTERMEDIATE IMAGE

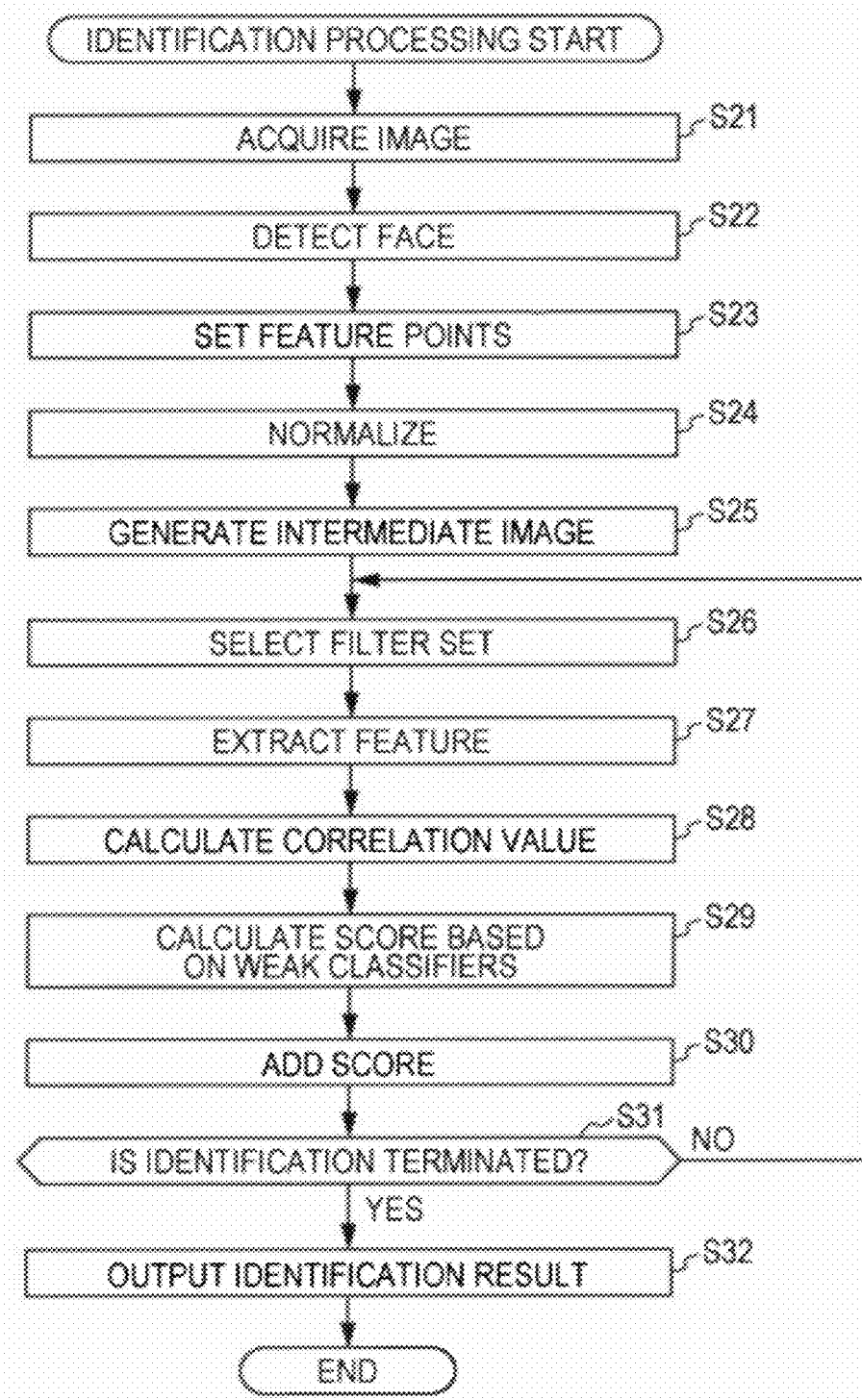

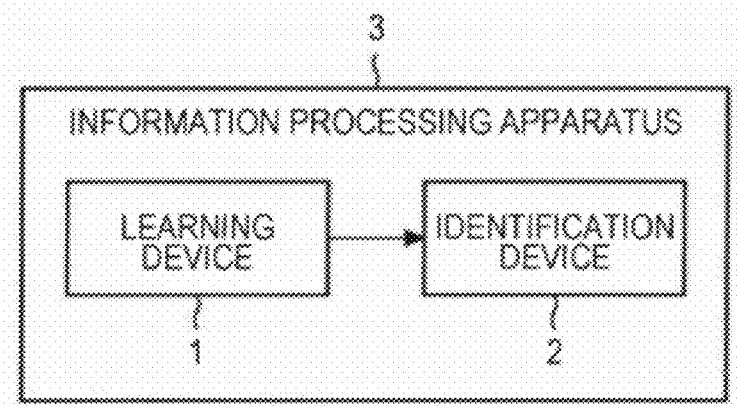

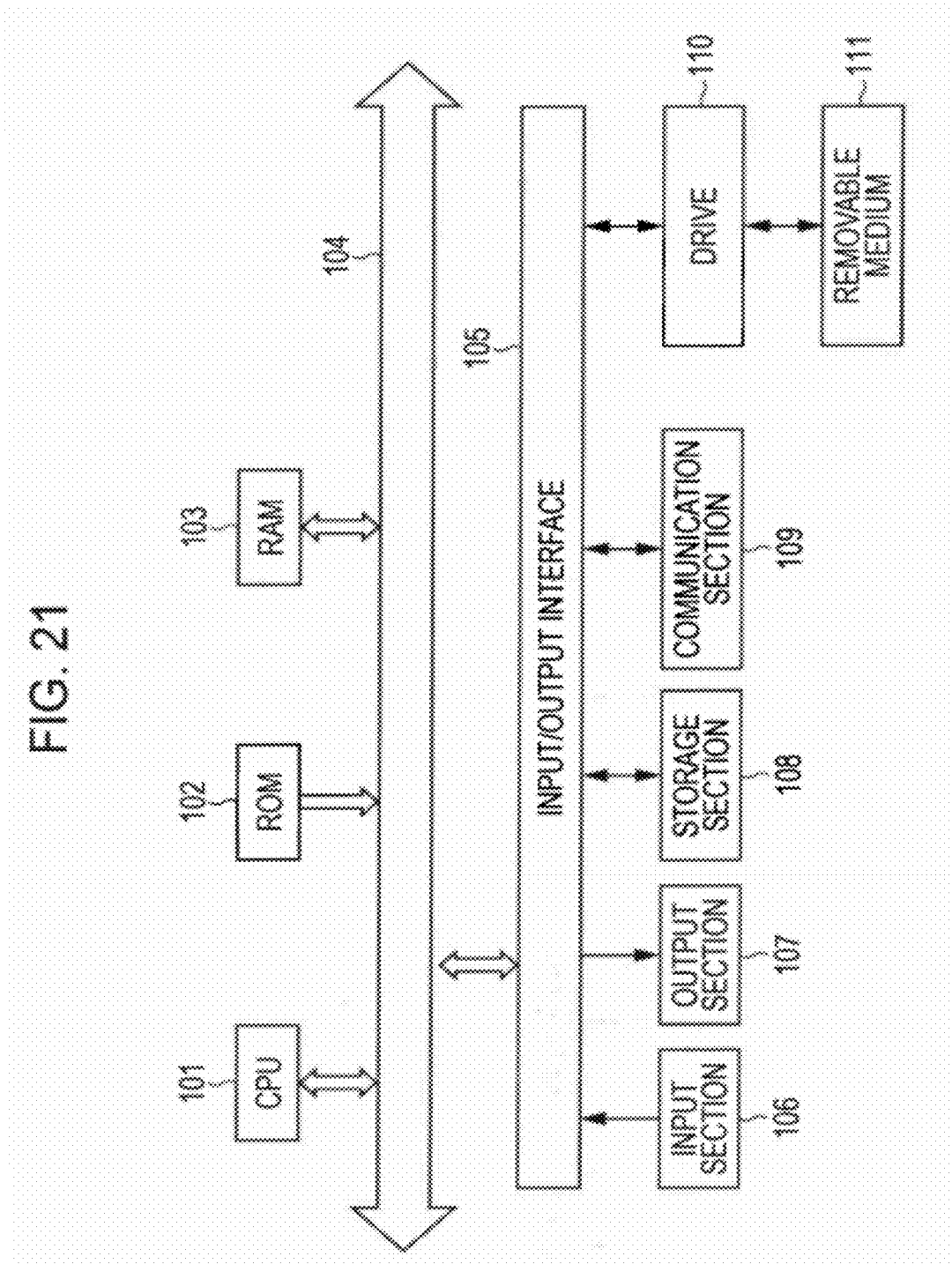

LEARNING DEVICE, LEARNING METHOD, IDENTIFICATION DEVICE, IDENTIFICATION METHOD, AND PROGRAM

BACKGROUND

The present disclosure relates to a learning device, a learning method, an identification device, an identification method, and a program. In particular, the disclosure relates to a learning device, a learning method, an identification device, an identification method, and a program capable of more promptly and more accurately identifying whether or not the subjects appearing in two images are the same subject.

Face identification methods in related art are roughly classified into two methods of an identification method using a same-individual classifier and an identification method using a multi-class classifier. The identification method using the same-individual classifier is disclosed in "Face Recognition Using Boosted Local Features" (Michael Jones and Paul Viola, Mitsubishi Electric Research Laboratories Technical Report, April 2003) and "Face Recognition Using Ada-Boosted Gabor Features" (P. Yang, S. Shan, W. Gao, S. Li, D. Zhang, International Conference on). The identification using the same-individual classifier is performed, for example, by calculating a difference between features extracted from two face images and using the difference as an input of the same-individual classifier.

The technique disclosed in "Face Recognition Using Boosted Local Features" is considered to be weak against changes in environment such as change in illumination in that a feature difference between correspondence points of two images is performed. Further, likewise, the technique disclosed in "Face Recognition Using Ada-Boosted Gabor Features" is also considered to be weak against changes in environment in that the same calculation processing is performed by using a filter different from a filter disclosed in "Face Recognition Using Boosted Local Features".

Accordingly, in order to solve the problem of weakness against environmental change, there is proposed a technique disclosed in Japanese Unexamined Patent Application Publication No. 2008-165731. FIG. 1 is a diagram illustrating a flow of face identification in related art disclosed in Japanese Unexamined Patent Application Publication No. 2008-165731.

In the apparatus disclosed in Japanese Unexamined Patent Application Publication No. 2008-165731, at the time of identification, as indicated by the tips of the arrows #1 and #2, features are extracted from the respective feature points of an input image by using a plurality of Gabor filters, and a feature vector, of which a parameter is set as the feature extracted by using each Gabor filter, is calculated for each feature point.

FIG. 2 is a diagram illustrating a Gabor filter. The characteristic of the Gabor filter is defined by the size and the direction of the fringe portion. In the apparatus disclosed in Japanese Unexamined Patent Application Publication No. 2008-165731, a predetermined number of filters are selected among 40 different filters, of which the characteristics are defined by 5 different sizes and 8 different orientations, in accordance with the positions of the feature points, and are used in extraction of the features at the respective feature points.

In the apparatus disclosed in Japanese Unexamined Patent Application Publication No. 2008-165731, the correlation between the feature vectors, which are calculated from the same feature points of two images, can be calculated as indicated by the tip of the outlined arrow #11. Further, as indicated by the tip of the arrow #12, the correlation vector, of which a parameter is the correlation coefficient of the feature vector representing the feature of the same feature point, is used as an input of the classifier, thereby determining whether or not the individuals are the same.

According to the technique disclosed in Japanese Unexamined Patent Application Publication No. 2008-165731, all the 40 different filters are not used in the feature extraction, but several filters are used therein by combining the outputs of the filters. Thus, it is possible to improve precision in identification.

SUMMARY

According to the technique disclosed in Japanese Unexamined Patent Application Publication No. 2008-165731, it is necessary to perform the filter operation by using the plurality of Gabor filters for each feature point, and thus it takes time to extract the features.

The disclosure has been made in consideration of the above situation, where it is desirable to more promptly and more precisely identify whether or not the subjects appearing in two images are the same subject.

According to a first embodiment of the disclosure, there is provided a learning device including: an acquisition section that acquires a plurality of image pairs in which the same subjects appear and a plurality of image pairs in which different subjects appear; a setting section that sets feature points on one image and the other image of each image pair which is acquired by the acquisition section; a selection section that selects a plurality of prescribed feature points, which are set at the same positions of the one image and the other image, so as to thereby select a feature extraction filter, which is used to extract a feature of the prescribed feature point, for each prescribed feature point; an extraction section that extracts the features of the prescribed feature points of each of the one image and the other image by using the plurality of feature extraction filters which are selected by the selection section; a calculation section that calculates a correlation between the features, which are extracted from the one image through the extraction section, and the features which are extracted from the other image through the extraction section; and a learning section that learns a same-subject classifier, which is for identifying whether or not the subjects appearing in two images are the same, on the basis of the correlation, which is calculated by the calculation section, and label information which represents whether or not the subjects appearing in the one image and the other image are the same subject.

It is preferable that the learning section should learn the same-subject classifier, which is a strong classifier formed of a plurality of weak classifiers, through boosting. In addition, it is also preferable that the selection section should randomly select the prescribed feature points and the feature extraction filters whenever the learning section learns the weak classifier.

It is preferable that each feature extraction filter should be a rectangle filter. In addition, it is also preferable that the learning device should further include a generation section that generates a first integral image, of which each pixel has a pixel value equal to a sum of luminance values of pixels within an area of a quadrangle which has a diagonal line connecting a reference position to the position of each pixel when a prescribed corner of four corners of an original image is set as the reference position, from the original image when each of the one image and the other image is set as the original image.

It is preferable that the generation section should further generate a second integral image, of which each pixel has a pixel value equal to a sum of luminance values of pixels within an area of a triangle which has a vertex angle of 90 degrees when the position of each pixel of the original image is set as a vertex thereof and a prescribed side of four sides of the original image is set as a base thereof, from the original image when each of the one image and the other image is set as the original image.

It is preferable that the learning device should further include a storage section that stores information, which represents the plurality of feature extraction filters selected by the selection section, and information of the same-subject classifier.

According to the first embodiment of the disclosure, there is provided a learning method including the steps of: acquiring a plurality of image pairs in which the same subjects appear and a plurality of image pairs in which different subjects appear; setting feature points on one image and the other image of each acquired image pair; selecting a plurality of prescribed feature points, which are set at the same positions of the one image and the other image, so as to thereby select a feature extraction filter, which is used to extract a feature of the prescribed feature point, for each prescribed feature point; extracting the features of the prescribed feature points of each of the one image and the other image by using the plurality of selected feature extraction filters; calculating a correlation between the features, which are extracted from the one image, and the features which are extracted from the other image; and learning a same-subject classifier, which is for identifying whether or not the subjects appearing in two images are the same, on the basis of the calculated correlation and label information which represents whether or not the subjects appearing in the one image and the other image are the same subject.

According to the first embodiment of the disclosure, there is provided a program for causing a computer to execute processing including the steps of: acquiring a plurality of image pairs in which the same subjects appear and a plurality of image pairs in which different subjects appear; setting feature points on one image and the other image of each acquired image pair; selecting a plurality of prescribed feature points, which are set at the same positions of the one image and the other image, so as to thereby select a feature extraction filter, which is used to extract a feature of the prescribed feature point, for each prescribed feature point; extracting the features of the prescribed feature points of each of the one image and the other image by using the plurality of selected feature extraction filters; calculating a correlation between the features, which are extracted from the one image, and the features which are extracted from the other image; and learning a same-subject classifier, which is for identifying whether or not the subjects appearing in two images are the same, on the basis of the calculated correlation and label information which represents whether or not the subjects appearing in the one image and the other image are the same subject.

According to a second embodiment of the disclosure, there is provided an identification device including: a storage section that stores information representing a plurality of feature extraction filters and information of a same-subject classifier generated through learning of a leaning device which acquires a plurality of image pairs in which the same subjects appear and a plurality of image pairs in which different subjects appear, sets feature points on one image and the other image of each acquired image pair, selects a plurality of prescribed feature points, which are set at the same positions of the one image and the other image, so as to thereby select the feature extraction filter, which is used to extract a feature of the prescribed feature point, for each prescribed feature point, extracts the features of the prescribed feature points of each of the one image and the other image by using the plurality of selected feature extraction filters, calculates a correlation between the features, which are extracted from the one image, and the features which are extracted from the other image, and learns the same-subject classifier, which is for identifying whether or not the subjects appearing in two images are the same, on the basis of the calculated correlation and label information which represents whether or not the subjects appearing in the one image and the other image are the same subject; an acquisition section that acquires the image pairs; a setting section that sets the feature points on the one image and the other image of each image pair which is acquired by the acquisition section; an extraction section that extracts the features of the respective feature points, which are set by the setting section, in the one image and the other image of the image pair, which is acquired by the acquisition section, by using the plurality of feature extraction filters which are represented by the information stored in the storage section; a calculation section that calculates the correlation between the features, which are extracted from the one image through the extraction section, and the features which are extracted from the other image through the extraction section; and an identification section that identifies whether or not the subjects, which appear in the one image and the other image of the image pair acquired by the acquisition section, are the same subject, on the basis of the same-subject classifier, when the correlation calculated by the calculation section is provided as an input.

It is preferable that the identification section should calculate a sum of scores which are calculated on the basis of a plurality of weak classifier constituting the same-subject classifier as a strong classifier, and should identify the subjects, which appear in the one image and the other image of the image pair acquired by the acquisition section, as the same subjects if the calculated sum is equal to or greater than a threshold value.

According to the second embodiment of the disclosure, there is provided an identification method of an identification device including a storage section that stores information representing a plurality of feature extraction filters and information of the same-subject classifier generated through learning of a leaning device which acquires a plurality of image pairs in which the same subjects appear and a plurality of image pairs in which different subjects appear, sets feature points on one image and the other image of each acquired image pair, selects a plurality of prescribed feature points, which are set at the same positions of the one image and the other image, so as to thereby select the feature extraction filter, which is used to extract a feature of the prescribed feature point, for each prescribed feature point, extracts the features of the prescribed feature points of each of the one image and the other image by using the plurality of selected feature extraction filters, calculates a correlation between the features, which are extracted from the one image, and the features which are extracted from the other image, and learns the same-subject classifier, which is for identifying whether or not the subjects appearing in two images are the same, on the basis of the calculated correlation and label information which represents whether or not the subjects appearing in the one image and the other image are the same subject. The identification method includes the steps of: acquiring the image pairs; setting the feature points on the one image and the other image of each acquired image pair; extracting the features of the respective set feature points in the one image and the other image of the acquired image pair by using the plurality of feature extraction filters which are represented by the information stored in the storage section; calculating a correlation between the features, which are extracted from the one image, and the features which are extracted from the other image; and identifying whether or not the subjects, which appear in the one image and the other image of the acquired image pair, are the same subject, on the basis of the same-subject classifier, when the correlation calculated by the calculation section is provided as an input.

According to the second embodiment of the disclosure, there is provided a program for causing a computer to execute processing of an identification device including a storage section that stores information representing a plurality of feature extraction filters and information of a same-subject classifier generated through learning of a leaning device which acquires a plurality of image pairs in which the same subjects appear and a plurality of image pairs in which different subjects appear, sets feature points on one image and the other image of each acquired image pair, selects a plurality of prescribed feature points, which are set at the same positions of the one image and the other image, so as to thereby select the feature extraction filter, which is used to extract a feature of the prescribed feature point, for each prescribed feature point, extracts the features of the prescribed feature points of each of the one image and the other image by using the plurality of selected feature extraction filters, calculates a correlation between the features, which are extracted from the one image, and the features which are extracted from the other image, and learns the same-subject classifier, which is for identifying whether or not the subjects appearing in two images are the same, on the basis of the calculated correlation and label information which represents whether or not the subjects appearing in the one image and the other image are the same subject. The processing includes the steps of: acquiring the image pairs; setting the feature points on the one image and the other image of each acquired image pair; extracting the features of the respective set feature points in the one image and the other image of the acquired image pair by using the plurality of feature extraction filters which are represented by the information stored in the storage section; calculating a correlation between the features, which are extracted from the one image, and the features which are extracted from the other image; and identifying whether or not the subjects, which appear in the one image and the other image of the acquired image pair, are the same subject, on the basis of the same-subject classifier, when the correlation calculated by the calculation section is provided as an input.

In the first embodiment of the disclosure, the plurality of image pairs in which the same subjects appear, and the plurality of image pairs in which the different subjects appear, are acquired, the feature points are set on one image and the other image of each acquired image pair, and the plurality of prescribed feature points, which are set at the same positions of the one image and the other image, are selected, thereby selecting the feature extraction filter, which is used to extract the feature of the prescribed feature point, for each prescribed feature point. Further, the features of the prescribed feature points of each of the one image and the other image are extracted by using the plurality of selected feature extraction filters, the correlation between the features, which are extracted from the one image, and the features, which are extracted from the other image, is calculated, and the same-subject classifier, which is for identifying whether or not the subjects appearing in two images are the same, is learned on the basis of the calculated correlation and label information which represents whether or not the subjects appearing in the one image and the other image are the same subject.

In the second embodiment of the disclosure, the image pairs are acquired, the feature points are set on the one image and the other image of each acquired image pair, and the features of the respective set feature points in the one image and the other image of the acquired image pair are extracted by using the plurality of feature extraction filters which are represented by the information stored in the storage section. Further, the correlation between the features, which are extracted from the one image, and the features, which are extracted from the other image, are calculated, and it is identified whether or not the subjects, which appear in the one image and the other image of the acquired image pair, are the same subject, on the basis of the same-subject classifier, when the correlation calculated by the calculation section is provided as an input.

According to the embodiments of the disclosure, it is desirable to more promptly and more precisely identify whether or not the subjects appearing in two images are the same subject.

BRIEF DESCRIPTION OF THE DRAWINGS

FIG. 1 is a diagram illustrating a flow of face identification in the related art;

FIG. 2 is a diagram illustrating a Gabor filter;

FIG. 3 is a block diagram illustrating an exemplary configuration of a learning device according to an embodiment of the disclosure;

FIG. 4 is a diagram illustrating learning performed by the learning device;

FIG. 5 is a diagram illustrating an example of face images on which feature points are set;

FIG. 7 is a diagram illustrating an example of a filter set;

FIG. 8 is a diagram illustrating an example of calculation of a correlation value;

FIG. 11 is a diagram illustrating an example of a method of calculating pixel values of the respective pixels of the intermediate image of FIG. 9;

FIG. 14 is a diagram illustrating an example of a method of calculating pixel values of the respective pixels of the intermediate image of FIG. 12;

FIG. 19 is a flowchart illustrating processing of the identification device;

FIG. 20 is a block diagram illustrating an exemplary configuration of an information processing apparatus; and FIG. 21 is a block diagram illustrating an exemplary configuration of a computer.

DETAILED DESCRIPTION OF EMBODIMENTS

Regarding Learning Device

Configuration of Learning Device

Figure 6A:
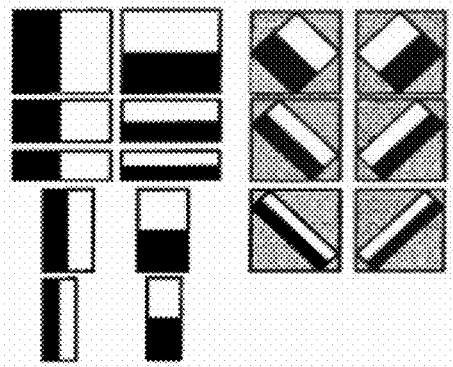
FIGS. 6A to 6D are diagrams illustrating examples of feature extraction filters.

FIG. 3 is a block diagram illustrating an exemplary configuration of a learning device according to an embodiment of the disclosure.

The learning device 1 of FIG. 3 generates a same-individual classifier, which is used to identify whether or not faces appearing in two images are the face of the same individual, through statistical learning. The data of the same-individual classifier, which is generated by the learning device 1, is supplied to an identification device that practically perform identification as to whether or not faces appearing in two images are the face of the same individual.

In the learning device 1, as shown in FIG. 4, a plurality of image pairs, in which the face of the same individual appear, and a plurality of image pairs, in which the faces of the different individuals appear, are input as images for learning. Each of the pair of images P11 and P12, the pair of images P21 and P22, and the pair of images Pn1 and Pn2 is the image pair in which the face of the same individual appears. On the other hand, each of the pair of images P11' and P12', the pair of images P21' and P22', and the pair of images Pm1' and Pm2' is the image pair in which faces of the different individuals appear.

The learning device 1 randomly selects a predetermined number of feature points among a plurality of feature points on the face images each of which is an image of a face part appearing in each input image. Further, the learning device 1 randomly selects a feature extraction filter, which is used to extract features of the face at the selected feature points, among a plurality of feature extraction filters provided in advance, and sets the feature extraction filter as a candidate of a weak classifier.

In the example of FIG. 4, four feature points at corresponding positions (each of which is the same position on the respective images) are selected among the feature points of each of the images P21' and P22'. Further, a filter set s, which is formed of the four feature extraction filters used to extract the features of the face at the respective feature points, is selected. In the learning device 1, as shown in each of the image P21' and the image P22', a plurality of different filters, which are formed of white rectangular areas and black rectangular areas, is provided as feature extraction filters. That is, the learning device 1 extracts rectangular features by using rectangle filters, and performs learning of classifiers through machine learning called boosting such as Adaboost.

The learning device 1 extracts features from each image by using the selected filter set s, calculates a correlation value between a feature vector, of which the parameters are features extracted from one image of each image pair, and a feature vector of which the parameters are features extracted from the other image thereof. The learning device 1 learns classifiers on the basis of the calculated correlation value as an input (feature quantity), and repeatedly performs the learning by reselecting a filter set for each round of boosting.

As described above, in the learning device 1, the feature points and the feature extraction filters are randomly selected, and the learning of the classifiers is performed on the basis of the correlation value of the feature vectors calculated from each image pair. Thereby, the learning device 1 is able to use features of various positions in the learning by combining the features, and is thus able to generate a classifier capable of further improving precision in identification. The series of processing of the learning device 1 will be described later.

An image acquisition section 11 of FIG. 3 acquires the plurality of image pairs, in which the face of the same individual appear, and the plurality of image pairs in which the faces of the different individuals appear. The learning device 1 receives an input of label information representing which pair is the image pair, in which the face of the same individual appear, and which pair is the image pair in which the faces of the different individuals appear. The images, which are acquired by the image acquisition section 11, are images which are taken by the digital camera and in which faces of individuals with various sizes and angles appear. The image acquisition section 11 outputs the acquired images to a face detection section 12.

The face detection section 12 generates face images by detecting parts of faces of individuals included in the respective images through analysis of the images which are supplied from the image acquisition section 11. The face detection section 12 outputs the generated face images to a feature point setting section 13 and a normalization section 14.

The feature point setting section 13 sets a plurality of feature points on each face image which is supplied from the face detection section 12, and outputs information of the feature points to the normalization section 14.

FIG. 5 is a diagram illustrating an example of face images on which feature points are set. The images P11 and P12 of FIG. 5 constitute a pair. In the example of FIG. 5, 9 feature points in the vertical direction and 6 feature points in the horizontal direction, that is, a total of 54 feature points are set at corresponding positions of each of the images P11 and P12.

The normalization section 14 detects the orientations of the faces by analyzing the face images which are supplied from the face detection section 12, and performs normalization processing such as affine transformation which transforms the face images such that the position of the feature point set by the feature point setting section 13 comes to the reference position. Thereby, even when a face appearing in the face image supplied from the face detection section 12 is not directed to the front, the face image is transformed into an image like the image in which a face directed to the front appears. The normalization section 14 outputs the face images, each of which is transformed such that the position of the feature point comes to the reference position, to the intermediate image generation section 20, and outputs information of feature points on the normalized face images to a filter set selection section 15.

The filter set selection section 15 randomly selects a predetermined number of feature points among a plurality of feature points set on each face image. Further, the filter set selection section 15 randomly selects feature extraction filters, which are used to extract features of the face at the respective selected feature points, among a plurality of feature extraction filters.

FIGS. 6A to 6D are diagrams illustrating examples of feature extraction filters.

The two-dimensional filters shown in FIGS. 6A to 6D are rectangle filters. The rectangle filters are formed of white areas and black areas having a predetermined number of rectangular shapes partitioned by lines in the horizontal, lines in the vertical direction, or lines tilted at 45 degrees with respect to a certain direction.

Figure 6B:
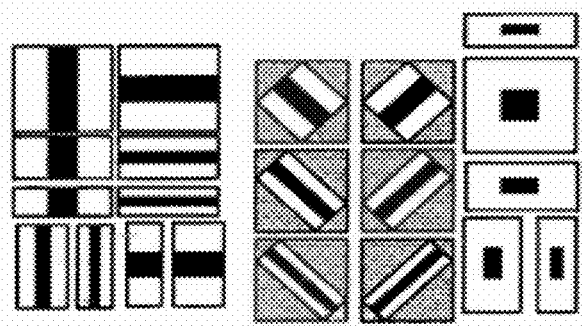
Figure 6C:
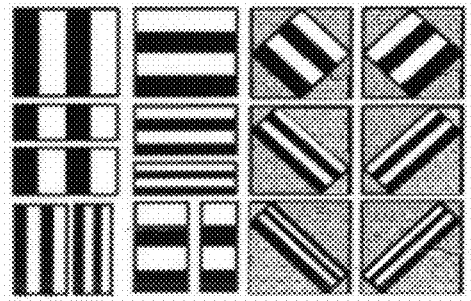
Figure 6D:
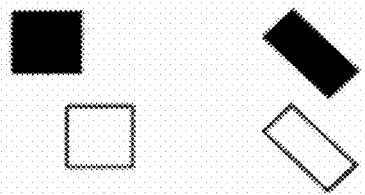

The extraction of the features using the rectangle filters is performed by arranging the rectangle filters at prescribed positions on the image and calculating the difference between the sum of the luminance values of the pixels included in the white areas and the sum of the luminance values of the pixels included in the black areas. For example, the two rectangle filters of FIG. 6A are appropriate for extraction of the features of the edges, and the three rectangle filters of FIGS. 6B and 6C are appropriate for extraction of the features of the lines.

The filter set selection section 15 randomly selects a prescribed feature extraction filter among such feature extraction filters for each feature point which is randomly selected, and determines a filter set.

FIG. 7 is a diagram illustrating an example of the filter set.

FIG. 7 shows n filter sets of filter sets s1 to Sn. Each filter set is selected for each round of, for example, boosting. In FIG. 7, r, to which a number is attached as a subscript, represents the feature extraction filter (the rectangle filter), and p represents the feature point. ($r_n$, $p_{xy}$) represents that the feature extraction filter, which is selected as a filter used for extraction of the feature of the face at the feature point $p_{xy}$ as a feature point at a position of x column and y row, is the feature extraction filter $r_n$.

The filter set s1 is formed of the feature extraction filter $r_1$ which is selected at the feature point $p_{13}$, the feature extraction filter $r_5$ which is selected at the feature point $p_{51}$, the feature extraction filter $r_3$ which is selected at the feature point $p_{23}$, ..., and the feature extraction filter $r_8$ which is selected at the feature point $p_{43}$. Further, the filter set s2 is formed of the feature extraction filter $r_3$ which is selected at the feature point $p_{33}$, the feature extraction filter $r_5$ which is selected at the feature point $p_{62}$, the feature extraction filter $r_1$ which is selected at the feature point $p_{63}$, ..., and the feature extraction filter $r_7$ which is selected at the feature point $p_{36}$.

The filter set selection section 15 outputs information of the filter sets, each of which is formed of a predetermined number of filters selected as described above, to a feature extraction section 16 and a learning section 18.

The feature extraction section 16 extracts features from all the face images by using the filter sets which are selected by the filter set selection section 15. The feature extraction section 16 calculates a feature vector, of which the parameters are features extracted from each face image, for each face image, and outputs information of the calculated feature vectors to a correlation value calculation section 17.

In addition, in the feature extraction section 16, the face images, which are used in the extraction of the features, are not face images which are generated by the face detection section 12 and are normalized by the normalization section 14, but intermediate images which are generated by an intermediate image generation section 20. As described later, in the intermediate image generation section 20, on the basis of the face images which are generated by the face detection section 12 and are normalized by the normalization section 14, integral images are generated as intermediate images.

The correlation value calculation section 17 calculates, on the basis of the information which is supplied from the feature extraction section 16, a correlation value between a feature vector, which is calculated from one image (the face image) constituting each image pair for learning which is input to the learning device 1, and a feature vector which is calculated from the other face image.

FIG. 8 is a diagram illustrating an example of calculation of the correlation value.

A description will be given of a case where the filter set s1 of FIG. 7 is selected. In this case, from the one face image constituting the same pair, the features at the feature points $p_{13}$, $p_{51}$, $p_{23}$, ..., and $p_{43}$ are extracted by respectively using the feature extraction filters $r_1$, $r_5$, $r_3$, ..., and $r_8$, thereby generating a feature vector V1 of which parameters are the features. Likewise, from the other face image constituting the same pair, the features at the feature points $p_{13}'$, $p_{51}'$, $p_{23}'$, ..., and $p_{43}'$ are extracted by respectively using the feature extraction filters $r_1$, $r_5$, $r_3$, ..., and $r_8$, thereby generating a feature vector V1' of which parameters are the features. Each of the feature points $p_{13}$, $p_{51}$, $p_{23}$, ..., and $p_{43}$ and each of the feature points $p_{13}'$, $p_{51}'$, $p_{23}'$, ..., and $p_{43}'$ are at the same position on each image.

The correlation value calculation section 17 calculates correlation values between corresponding parameters of the feature vector V1 and the feature vector V1', and generates a correlation vector of which parameters are the calculated correlation values. The correlation value calculation section 17 generates such a correlation vector for each of all the image pairs for learning, and outputs information of the correlation vector generated on the basis of each pair to the learning section 18.

The learning section 18 performs statistical learning using, for example, Adaboost, on the basis of the correlation vectors which are generated by the correlation value calculation section 17, when the above-mentioned filter set is used as a candidate of a weak classifier, thereby generating a same-individual classifier formed of a plurality of weak classifiers.

That is, when N image pairs for learning are input, the learning section 18 assigns 1/N as a weight of each of N correlation vectors which are generated by the correlation value calculation section 17 by using a certain filter set. The learning section 18 performs learning on the basis of the N correlation vectors and label information (in a case of the same individual, +1, otherwise −1), thereby generating the weak classifiers.

The learning section 18 thereafter increases the weights of samples (the image pairs for learning) which are not classified by the weak classifiers as targets of the learning at the previous stage, and repeatedly performs weighted learning on the basis of the N correlation vectors which are generated by using a different filter set. The learning section 18 makes a learning data storage section 19 store preliminary data formed of information of the filter sets and parameters of the respective weak classifiers obtained by the learning and information on the same-individual classifier such as reliability. Each weak classifier outputs a predetermined score when receiving an input of a correlation vector which is extracted from the face image by using a filter set the same as the filter set used in the learning of the weak classifier.

An intermediate image generation section 20 generates integral images on the basis of the face images supplied from the normalization section 14, and outputs the images as intermediate images to the feature extraction section 16. As described above, the feature extraction filters, which are used in the learning device 1, are rectangle filters formed of rectangular white areas and black areas. The intermediate image is generated in order to easily calculate the sum of the luminance values of the pixels included in the white area or the black area which has a prescribed shape.

Figure 9:
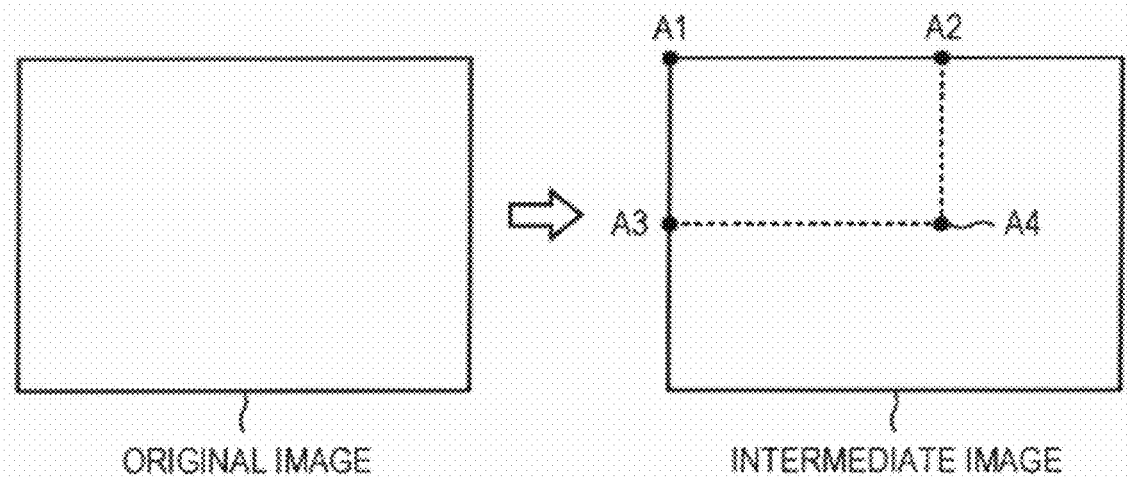
FIG. 9 is a diagram illustrating an example of generation of an intermediate image.

FIG. 9 is a diagram illustrating an example of generation of the intermediate image.

The size (the number of pixels) of the intermediate image is the same as the size of the original image. Assuming that a prescribed position such as the top left corner of the four corners of the original image is set as a reference position, the pixel value of each pixel of the intermediate image represents the sum of the luminance values of the respective pixels of the original image included in the quadrangle having the diagonal line connecting the reference position to a position of each pixel.

In the example of FIG. 9, the point A1 at the top left corner is set as the reference position. The pixel value of the pixel at the point A4 on the intermediate image represents the sum of the luminance values of the respective pixels of the original image included in the area of the quadrangle of which the diagonal line connects the point A1 and the point A4 and of which the vertexes are the points A1, A2, A4, and A3. Likewise, for example, the pixel value of the pixel at the bottom right corner on the intermediate image represents the sum of the luminance values of the entire pixels of the original image.

Figure 10:
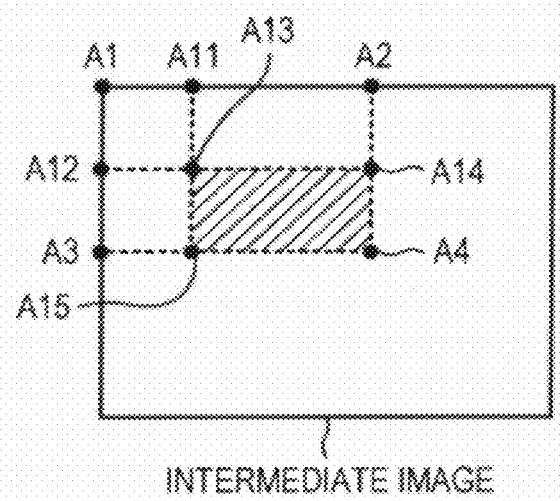
FIG. 10 is a diagram illustrating an example of feature extraction using the intermediate image of FIG. 9.

FIG. 10 is a diagram illustrating an example of feature extraction using the intermediate image.

A description will be given of a case of calculating the sum of the luminance values of the pixels of the original image included in the area of the quadrangle which is indicated by the hatching in FIG. 10 and of which the vertexes are the points A13, A14, A4, and A15. The point A11 is a point between the points A1 and A2, and the point A12 is a point between the point A1 and the point A3. The point A14 is a point between the points A2 and A4, and the point A15 is a point between the point A3 and the point A4. The point A13 is an intersection point between the horizontal line connecting the point A12 to the point A14 and the vertical line connecting the point A11 and the point A15.

In this case, the pixel value of the pixel at the point A13 on the intermediate image represents the sum of the luminance values of the pixels of the original image included in the area of the quadrangle of which the vertexes are the points A1, A11, A13, and A12. Further, the pixel value of the pixel at the point A14 represents the sum of the luminance values of the pixels of the original image included in the area of the quadrangle of which the vertexes are the points A1, A2, A14, and A12. The pixel value of the pixel at the point A15 represents the sum of the luminance values of the pixels of the original image included in the area of the quadrangle of which the vertexes are the points A1, A11, A15, and A3.

The pixel value of the pixel at the point A4 represents, as described above, the sum of the luminance values of the pixels of the original image included in the area of the quadrangle of which the vertexes are the points A1, A2, A4, and A3. Accordingly, the sum of the luminance values of the pixels of the original image included in the area which is indicated by the hatching can be obtained by subtracting the pixel value of the pixel at the point A14 and the pixel value of the pixel at the point A15 from the pixel value of the pixel at the point A4 and adding the pixel value of the pixel at the point A13 thereto.

FIG. 11 is a diagram illustrating an example of a method of calculating pixel values of the respective pixels of the intermediate image.

A description will be given of a case of calculating the luminance value of the pixel $p'_{101}$ of the intermediate image indicated by the hatching on the lower side of FIG. 11. The pixels $p'_{101}$, $p'_{102}$, $p'_{103}$, and $p'_{104}$ of the intermediate image respectively correspond to the pixels $p_{101}$, $p_{102}$, $p_{103}$, $p_{104}$ of the original image.

The pixel value of a single pixel on the lower right side among four pixels of 2×2 located at a prescribed position on the intermediate image can be obtained by subtracting the upper left pixel from the sum of the pixel value of the upper right pixel and the pixel value of the lower left pixel and adding the luminance value of the single pixel of the original image at the corresponding position thereto. That is, the pixel value of the pixel $p'_{101}$ of the intermediate image can be obtained by subtracting the pixel value of the pixel $p'_{102}$ from the sum of the pixel value of the pixel $p'_{103}$ and the pixel value of the pixel $p'_{104}$ and adding the luminance value of the pixel $p_{101}$ of the original image thereto.

The intermediate image generation section 20 generates such intermediate images by using all images, which are input to the learning device 1, as original images. Once such intermediate images are generated, when the feature extraction section 16 performs the feature extraction by using the plurality of feature extraction filters (vertical and horizontal filters) of which each area is partitioned by the horizontal or vertical lines, it is possible to easily perform the calculation.

Figure 12:
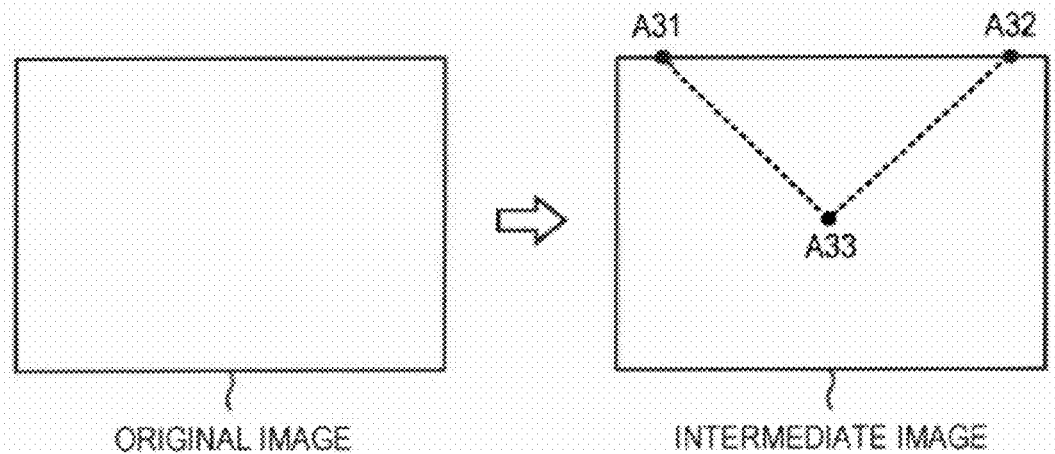
FIG. 12 is a diagram illustrating an example of generation of another intermediate image.

FIG. 12 is a diagram illustrating an example of generation of another intermediate image.

The intermediate image generation section 20 also generates the intermediate images for facilitating the calculation using the feature extraction filter (a tilt filter) of which the area is partitioned by the line tilted at 45 degrees with respect to the horizontal or vertical line. The intermediate image is generated such that the pixel value of each pixel thereof represents the sum of the luminance values of the respective pixels of the original image included in an area of a triangle of which the vertex is at the position of each pixel, of which the base is the prescribed side such as the upper side of the four sides of the original image, and of which the vertex angle is 90 degrees.

In the example of FIG. 12, the upper side is the base thereof. The pixel value of the pixel of the at the point A33 on the intermediate image represents the sum of the luminance values of the respective pixels of the original image included in the area of the triangle of which the vertex angle is 90 degrees and of which the vertexes are points A31, A32, and A33.

Figure 13:
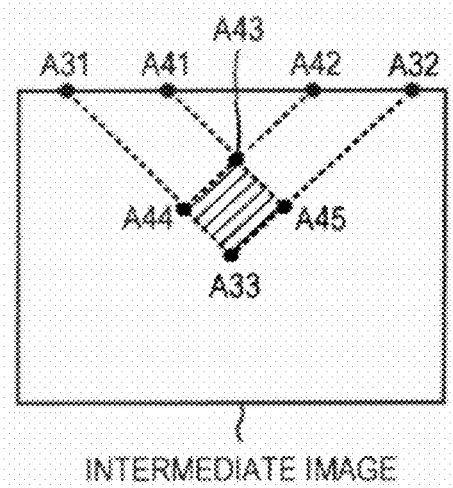
FIG. 13 is a diagram illustrating an example of feature extraction using the intermediate image of FIG. 12.

FIG. 13 is a diagram illustrating an example of feature extraction using the intermediate image of FIG. 12.

A description will be given of a case of calculating the sum of the luminance values of the pixels of the original image included in the area of the quadrangle which is indicated by the hatching in FIG. 13 and of which the vertexes are the points A43, A45, A33, and A44. The point A44 is a point between the points A31 and A33, and the point A45 is a point between the point A33 and the point A32. The point A42 is an intersection point between the line, which is parallel with the line connecting the point A32 to the point A33 and passes the point A44, and the line connecting the point A31 and the point A32. The point A41 is an intersection point between the line, which is parallel with the line connecting the point A31 to the point A33 and passes the point A45, and the line connecting the point A31 and the point A32. The point A43 is an intersection point between the line connecting the point A41 to the point A45, and the line connecting the point A42 and the point A44.

In this case, the pixel value of the pixel at the point A43 represents the sum of the luminance values of the pixels of the original image included in the area of the triangle of which the vertexes are the points A41, A42, and A43. Likewise, the pixel value of the pixel at the point A44 represents the sum of the luminance values of the pixels of the original image included in the area of the triangle of which the vertexes are the points A31, A42, and A44. The pixel value of the pixel at the point A45 represents the sum of the luminance values of the pixels of the original image included in the area of the triangle of which the vertexes are the points A41, A32, and A45.

The pixel value of the pixel at the point A33 on the intermediate image represents the sum of the luminance values of the pixels of the original image included in the area of the triangle of which the vertexes are the points A31, A32, and A33. Accordingly, the sum of the luminance values of the pixels of the original image included in the area which is indicated by the hatching can be obtained by subtracting the pixel value of the pixel at the point A44 and the pixel value of the pixel at the point A45 from the pixel value of the pixel at the point A33 and adding the pixel value of the pixel at the point A43 thereto.

FIG. 14 is a diagram illustrating an example of a method of calculating pixel values of the respective pixels of the intermediate image of FIG. 12.

A description will be given of a case of calculating the luminance value of the pixel $p'_{111}$ of the intermediate image indicated by the hatching on the lower side of FIG. 14. The pixels $p'_{111}$, $p'_{112}$, $p'_{113}$, and $p'_{114}$ of the intermediate image respectively correspond to the pixels $p_{111}$, $p_{112}$, $p_{113}$, $p_{114}$ of the original image.

The pixel value of a single pixel located at a prescribed position on the intermediate image can be obtained by subtracting the directly upper pixel from the sum of the pixel value of the upper left pixel and the pixel value of the upper right pixel and adding the luminance value of the single pixel of the original image at the corresponding position thereto. That is, the pixel value of the pixel $p'_{111}$ of the intermediate image can be obtained by subtracting the pixel value of the pixel $p'_{113}$ from the sum of the pixel value of the pixel $p'_{112}$ and the pixel value of the pixel $p'_{114}$ of the intermediate image and adding the luminance value of the pixel $p_{111}$ of the original image thereto.

The intermediate image generation section 20 generates such intermediate images by using all images, which are input to the learning device 1, as original images. Thereby, when the feature extraction section 16 the feature extraction by using the tilt filter, it is possible to easily perform the calculation.

Operation of Learning Device

Next, referring to the flowchart of FIG. 15, processing of the learning device 1 configured as described above will be described.

In step S1, the image acquisition section 11 acquires the plurality of image pairs, in which the face of the same individual appear, and the plurality of image pairs in which the faces of the different individuals appear.

In step S2, the face detection section 12 generates the face images by detecting parts of faces of individuals included in the respective images which are acquired by the image acquisition section 11.

In step S3, the feature point setting section 13 sets a plurality of feature points on each face image.

In step S4, the normalization section 14 detects the orientations of the faces by analyzing the face images, and normalizes the face images such that the position of the feature point comes to the reference position.

In step S5, the intermediate image generation section 20 generates intermediate images on the basis of the normalized face images. The intermediate image generation section 20 outputs the intermediate images, which are for extracting the features by using the vertical/horizontal filters, and the intermediate images, which are for extracting the features by using the tilt filter, to the feature extraction section 16, where the intermediate images are generated from the respective images acquired by the image acquisition section 11 as original images.

In step S6, the filter set selection section 15 randomly selects the plurality of feature points set on the face images. Further, the filter set selection section 15 randomly selects feature extraction filters which are used to extract features of the face at the respective selected feature points.

In step S7, the feature extraction section 16 extracts features of all the face images by applying the filter sets, which are selected by the filter set selection section 15, to the intermediate images. The feature extraction section 16 calculates a feature vector, of which the parameters are the extracted features, for each face image.

Here, the feature extraction section 16 may extract the features through a certain feature extraction filter so as to thereby generate the feature vector, and thereafter extract features at the same positions through the same feature extraction filter, of which the black area and the white area are replaced with each other, so as to thereby generate the feature vector. The feature extraction using the feature extraction filter, of which the black area and the white area are replaced, corresponds to calculation of an absolute value of the difference between the sum of the luminance values of the pixels included in the white area and the sum of the luminance values of the pixels included in the black area.

Figure 16:
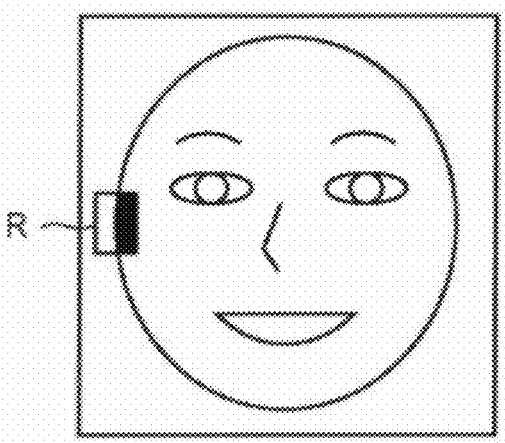
FIG. 16 is a diagram illustrating feature extraction of a contour part of a face.

Thereby, in particular, as shown in FIG. 16, when a feature at a part of the contour of the face is extracted by using the feature extraction filter R in which the white area and the black area are respectively arranged on the left side and the right side thereof, it is possible to perform learning of a classifier which does not depend on the luminance of the background.

Further, after a feature at a certain feature point is extracted through a certain feature extraction filter, by extracting a feature at a pixel point adjacent thereto through the same feature extraction filter, it may be possible to generate a feature vector of which the parameter is the sum or the average of the features. That is, by shifting the position and extracting the feature through the same feature extraction filter, the feature extraction section 16 calculates the sum or the average of the features.

In such a manner, it is possible to generate a classifier which is capable of accurately performing identification regardless of shape change of a face. The range of the adjacent pixel point may be arbitrarily set, and the ranges of the shifts in the x-axis direction and the y-axis direction may differ from each other.

In addition, considering the time consumed for the feature extraction and the like, it may be possible to skip the calculation of the absolute value and the feature extraction in which the position of the feature extraction filter is shifted.

Figure 15:
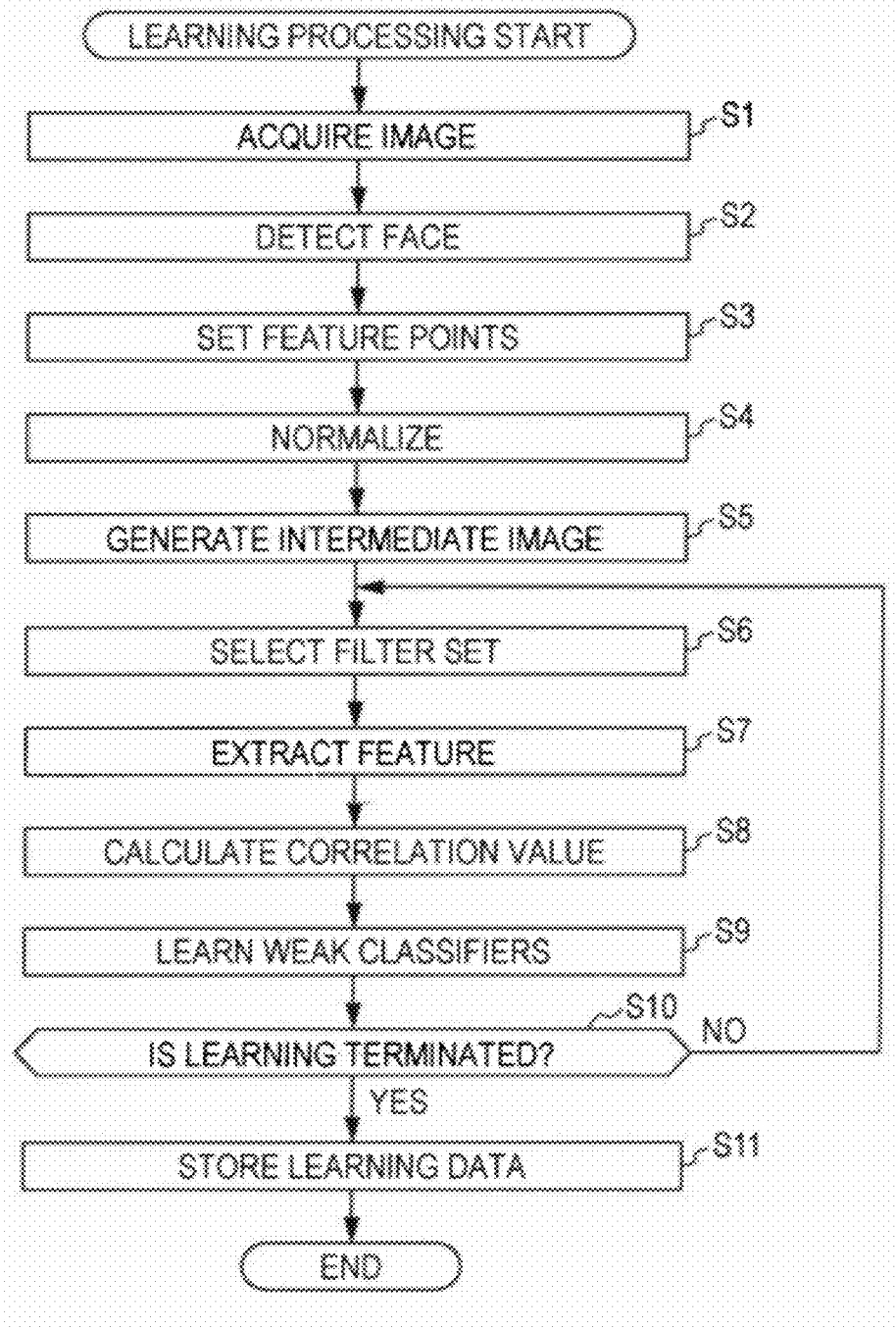
FIG. 15 is a flowchart illustrating processing of the learning device.

Returning to the description of FIG. 15, in step S8, the correlation value calculation section 17 calculates the correlation value between the feature vector, which is calculated from one image constituting the image pair for learning, and a feature vector, which is calculated from the other image constituting the same pair, thereby generating a correlation vector which represents a correlation.

In step S9, the learning section 18 performs learning on the basis of the correlation vector which is generated by the correlation value calculation section 17.

In step S10, the learning section 18 determines whether or not the learning is terminated. If it is determined in step S10 that the learning is not terminated, the procedure returns to step S6, a filter set is newly selected, and boosting is repeated.

In contrast, if it is determined in step S10 that the learning is terminated, in step S11, the learning section 18 makes the learning data storage section 19 store the information on the same-individual classifier as a strong classifier formed of the plurality of weak classifiers, and ends the processing.

As described above, the learning is performed through combination of features which are extracted from the plurality of feature point by using the plurality of feature extraction filters. In such a manner, it is possible to generate a classifier capable of further improving precision in identification. For example, similarly to the way of performing the learning by simultaneously extracting the features of eyes and a nose of the face from each of two images, by using the combination of the features at the plurality of positions on the face, the precision of the classifier may increase.

Further, the integral images are generated as the intermediate images, and the feature extraction is performed by using the rectangle filters. Hence, it is possible to easily perform even complex calculations using the combination of the plurality of feature extraction filters and the plurality of feature points. When the original images are directly set as targets of the feature extraction without generation of the integral images, convolution operations of the luminance values are necessary, but in the embodiment, it is not necessary to perform the operations.

Regarding Identification Device

Configuration of Identification Device

Figure 17:
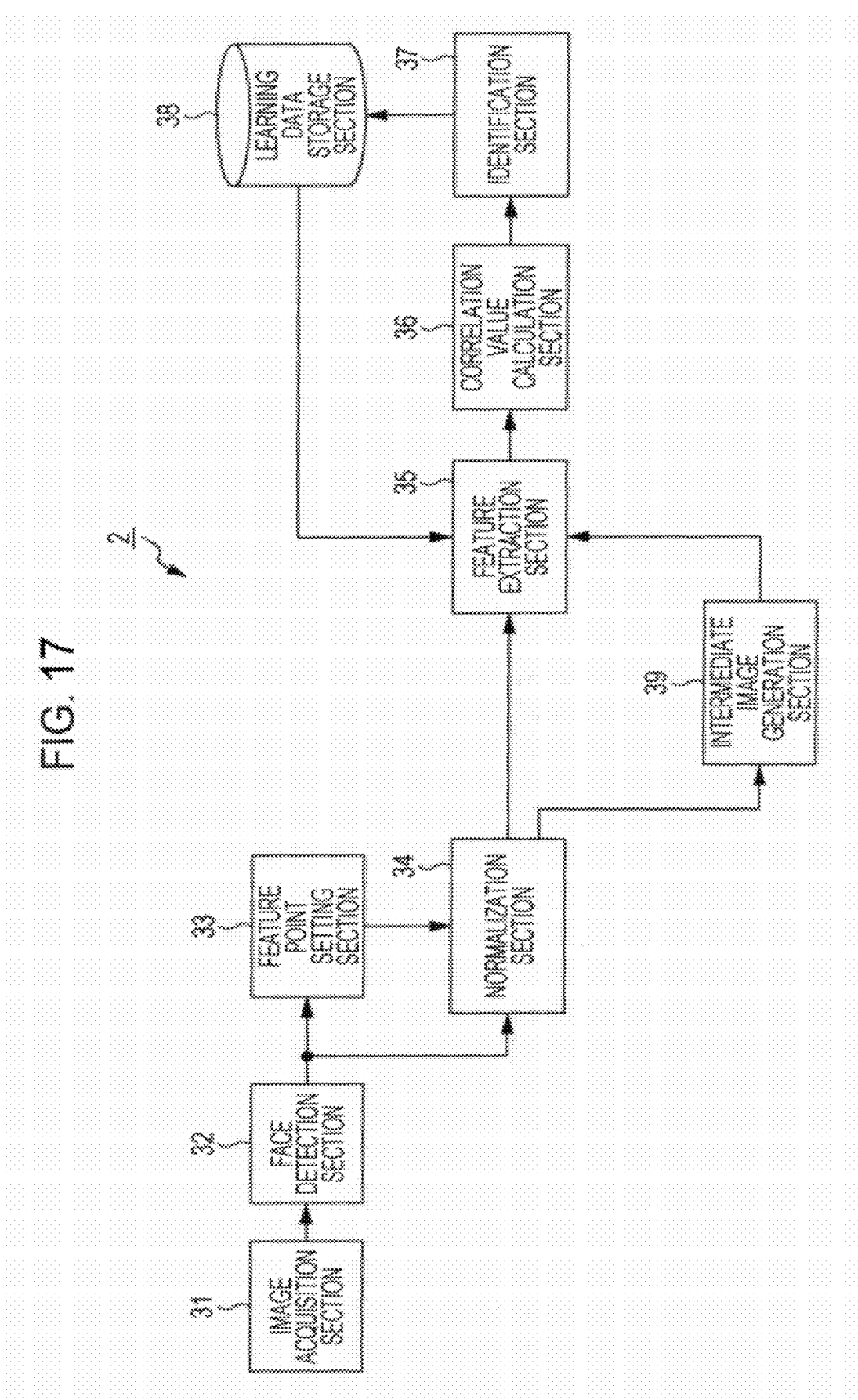
FIG. 17 is a block diagram illustrating an exemplary configuration of an identification device.

FIG. 17 is a block diagram illustrating an exemplary configuration of an identification device.

The identification device 2 of FIG. 17 identifies whether or not faces appearing in two images are the face of the same individual, on the basis of the same-individual classifier which is generated by the learning device 1. Information on the same-individual classifier is provided from the learning device 1 to the identification device 2 through a network or through a recording medium such as a memory card.

Figure 18:
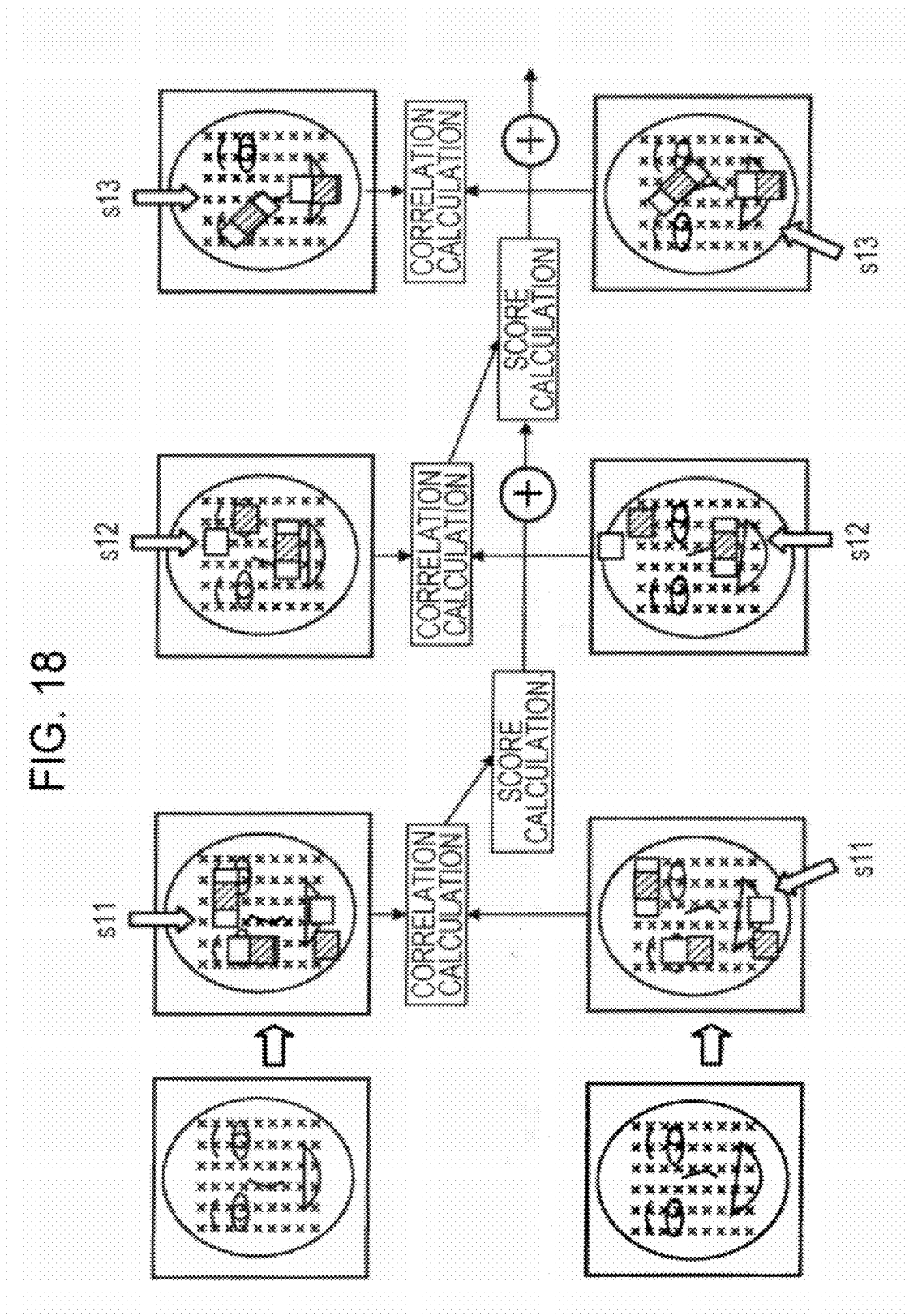
FIG. 18 is a diagram illustrating identification using the identification device.

As shown in FIG. 18, the identification device 2 receives an input of the image pairs, in which the faces of the individuals appear, as identification target images. The identification device 2 extracts, as indicated by the tip of the outlined arrow, features of the faces appearing in the respective images on the basis of the filter set s11 which is a feature extraction filter set selected during learning. The identification device 2 calculates a correlation between the feature vector, of which the parameters are the features extracted from one image thereof, and the feature vector, of which the parameters are the features extracted from the other image thereof, and calculates a score by using the vectors as inputs to the weak classifiers which are learned through the filter set s11.

Likewise, the identification device 2 extracts the features of the faces appearing in the respective images on the basis of the filter set s12, and calculates a correlation between the feature vector, of which the parameters are the features extracted from one image thereof, and the feature vector of which the parameters are the features extracted from the other image thereof. The identification device 2 calculates a score when the calculated correlation is provided as an input to the weak classifier learned through the filter set s12. The identification device 2 calculates such scores through the respective weak classifiers. For example, if the sum of the scores is equal to or greater than a threshold value, it is determined that the faces appearing in two input images are the face of the same individual.

In such a manner, on the basis of the same-individual classifier which is generated by the learning device 1, the identification device 2 is able to accurately identify whether or not faces appearing in two input images are the face of the same individual.

An image acquisition section 31 of FIG. 17 acquires the image pairs in which the faces of the individuals appear, and outputs the image pairs to a face detection section 32.

The face detection section 32 generates face images by detecting parts of faces of individuals included in the respective images through analysis of the images which are supplied from the image acquisition section 31 similarly to the face detection section 12 of the learning device 1. The face detection section 32 outputs the generated face images to a feature point setting section 33 and a normalization section 34.

The feature point setting section 33 sets a plurality of feature points on each face image which is supplied from the face detection section 32, and outputs information of the feature points to the normalization section 34.

The normalization section 34 detects the orientations of the faces by analyzing the face images which are supplied from the face detection section 32 similarly to the normalization section 14 of the learning device 1, and normalizes the face images such that the position of the feature point set by the feature point setting section 33 comes to the reference position. The normalization section 34 outputs the normalized face images to an intermediate image generation section 39, and outputs information of the feature points to a feature extraction section 35.

The feature extraction section 35 selects filter sets on the basis of the information stored in a learning data storage section 38. The learning data storage section 38 stores information on the same-individual classifier which is generated by the learning device 1. The information of the filter set includes information representing which feature point each feature extraction filter constituting the filter set is used in the feature extraction at.

The feature extraction section 35 extracts features at the prescribed feature points of each face image by using the respective feature extraction filters constituting the selected filter set. The feature extraction section 35 calculates a feature vector, of which the parameters are features extracted from each face image, for each face image, and outputs information of the calculated feature vectors to a correlation value calculation section 36. In addition, the face images, which are used in the extraction of the features in the feature extraction section 35, may be the intermediate images which are generated by the intermediate image generation section 39, and may be the face images which are generated by the face detection section 32 and are normalized by the normalization section 34.

The correlation value calculation section 36 calculates, on the basis of the information which is supplied from the feature extraction section 35, a correlation vector between a feature vector, which is calculated from one face image of the pair as an identification target input to the identification device 2, and a feature vector which is calculated from the other face image. The correlation value calculation section 36 outputs information of the calculated correlation vector to an identification section 37.

The identification section 37 reads out the information of the weak classifiers constituting the same-individual classifier from the learning data storage section 38, and calculates a score when the correlation vector calculated by the correlation value calculation section 36 is provided as an input to each weak classifier. If the sum of the scores calculated by using the respective weak classifiers is equal to or greater than a threshold value, the identification section 37 determines that the faces appearing in two input images are the face of the same individual. If the sum is less than a threshold value, the identification section 37 determines that the faces appearing in two input images are not the face of the same individual. The determination result of the identification section 37 may be displayed, for example, on a display connected to the identification device 2, or may be output as a sound from a speaker connected to the identification device 2.

The intermediate image generation section 39 appropriately generates integral images on the basis of the face images which are supplied from the normalization section 34 similarly to the intermediate image generation section 20 of the learning device 1, and outputs the images as the intermediate images to the feature extraction section 35.

Operation of Identification Device

Next, referring to the flowchart of FIG. 19, processing of the identification device 2 will be described.

In step S21, the image acquisition section 31 acquires the image pairs of the identification target.

In step S22, the face detection section 32 generates the face images by detecting parts of faces of individuals included in the respective images which are acquired by the image acquisition section 31.

In step S23, the feature point setting section 33 sets a plurality of feature points on each face image.

In step S24, the normalization section 34 normalizes the face images.

In step S25, the intermediate image generation section 39 generates intermediate images on the basis of the normalized face images. The intermediate image generation section 39 generates the intermediate images, which are for extracting the features by using the vertical/horizontal filters, and the intermediate images, which are for extracting the features by using the tilt filter, from the respective images acquired by the image acquisition section 31 as original images, similarly to the intermediate image generation section 20 of the learning device 1.

In step S26, the feature extraction section 35 selects filter sets on the basis of the information stored in a learning data storage section 38.

In step S27, the feature extraction section 35 extracts features at the prescribed feature points of each face image by using the respective feature extraction filters constituting the selected filter set. The feature extraction section 35 calculates a feature vector, of which the parameters are features extracted from each face image, for each face image.

In step S28, correlation value calculation section 36 generates a correlation vector between a feature vector, which is calculated from one face image of the pair as an identification target input to the identification device 2, and a feature vector which is calculated from the other face image.

In step S29, the identification section 37 reads out the information of the weak classifiers constituting the same-individual classifier from the learning data storage section 38, and calculates a score when the correlation vector calculated by the correlation value calculation section 36 is provided as an input to each weak classifier.

In step S30, the identification section 37 adds the newly calculated score to the score calculated hitherto.

In step S31, the identification section 37 determines whether or not the identification is terminated. If it is determined in step S31 that the identification is not terminated, the procedure returns to step S26, a filter set is newly selected, and score calculation is repeated. For example, until the scores are calculated by using all the weak classifiers, the score calculation using the weak classifiers is repeated.

In contrast, if it is determined in step S31 that the identification is terminated, in step S32, the identification section 37 determines whether or not faces appearing in two images are the face of the same individual, on the basis of the sum of the scores calculated by using the respective weak classifiers. The identification section 37 outputs the identification result, and terminates the processing.

Through the above-mentioned processing, it is possible to accurately identify whether or not faces appearing in two images are the face of the same individual.

Modified Example

In the above description, the learning device 1 and the identification device 2 are different devices. However, as shown in FIG. 20, the learning device 1 and the identification device 2 may be implemented in a single information processing apparatus 3. The learning result, which is obtained by the learning device 1 implemented in the information processing apparatus 3, is provided to the identification device 2, and is used in the identification as to whether or not faces appearing in two images are the face of the same individual.

Further, the description was given of the identification using the classifiers and the learning of the classifiers used in the identification as to whether or not the faces belong to the same individual. However, the above-mentioned processing may be applied to the identification using classifiers and the learning of the classifiers used in the identification as to whether or not the different subjects appearing in two images are the same.

Exemplary Configuration of Computer

The above-mentioned series of processing may be performed by hardware, and may be performed by software. When the series of processing is performed by software, the programs constituting the software are installed from a program recording medium in a computer built in the dedicated hardware, a general personal computer, or the like.

FIG. 21 is a block diagram illustrating an exemplary configuration of the hardware of the computer which performs the above-mentioned series of processing through a program.

A CPU (Central Processing Unit) 101, a ROM (Read Only Memory) 102, and a RAM (Random Access Memory) 103 are connected to each other through a bus 104.

The bus 104 is further connected to an input/output interface 105. The input/output interface 105 is connected to: an input portion 106 which is formed of a keyboard, a mouse, and the like; and an output portion 107 which is formed of a display, a speaker, and the like. Further, the input/output interface 105 is connected to: a storage portion 108 which is formed of a hard disk, non-volatile memory, and the like; a communication portion 109 which is formed of a network interface and the like; and a drive 110 which drives a removable medium 111.

In the computer configured as described above, for example, the CPU 101 loads and executes the program, which is stored in the storage portion 108, in the RAM 103 through the input/output interface 105 and the bus 104, thereby performing the above-mentioned series of processing.

The program executed by the CPU 101 is stored in, for example, the removable medium 111. Alternatively, the program is provided through a wired or wireless transmission medium such as a Local Area Network, the Internet, or a digital broadcast, and is installed in the storage section 108.

In addition, the program executed by the computer may be a program which chronologically performs the processing in order of description of the present specification, and may be a program which performs the processing in parallel or at necessary timing such as the timing of calling.

The present disclosure contains subject matter related to that disclosed in Japanese Priority Patent Application JP 2010-229368 filed in the Japan Patent Office on Oct. 12, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A learning device, comprising:
   circuitry configured to:
   acquire a first plurality of image pairs in which same subjects appear and a second plurality of image pairs in which different subjects appear;

set feature points on a first image and a second image of each image pair of the first plurality of image pairs and of the second plurality of image pairs;

select a plurality of prescribed feature points set at corresponding same positions on the first image and the second image of each image pair of the first plurality of image pairs and of each image pair of the second plurality of image pairs, so as to thereby select feature extraction filters, which are used to extract a feature for each prescribed feature of the prescribed feature points;

extract the feature for each prescribed feature of the prescribed feature points on each of the first image and the second image of each image pair of the first plurality of image pairs and of each image pair of the second plurality of image pairs by using the selected feature extraction filters;

calculate a correlation between the extracted features for each image pair of the first plurality of image pairs, and for each image pair of the second plurality of image pairs; and learn same-subject classifiers for identifying whether or not the same subjects appear, on the basis of the calculated correlation and label information representing in which pair of the first plurality of image pairs and of the second plurality of image pairs the same subject appears, wherein the same-subject classifiers comprise at least one strong classifier and at least one weak classifier, and wherein the circuitry is further configured to:
  learn a same-subject classifier of the same-subject classifiers that is a strong classifier formed of a plurality of weak classifiers, through boosting, and
  randomly select the prescribed feature points and the feature extraction filters whenever a weak classifier of the plurality of weak classifiers is learned.

2. The learning device according to claim 1, wherein the circuitry is further configured to generate a first integral image from an original image when each of the first image and the second image is set as the original image, the first integral image having a first plurality of pixels, of which each pixel of the first plurality of pixels has a pixel value equal to a sum of luminance values of pixels within an area of a quadrangle among the first plurality of pixels that has a diagonal line connecting a reference position to a position of each pixel when a prescribed corner of four corners of the original image is set as the reference position, wherein each feature extraction filter of the feature extraction filters is a rectangle filter.

3. The learning device according to claim 2, wherein the circuitry is further configured to generate a second integral image from the original image, the second integral image having a second plurality of pixels, of which each pixel of the second plurality of pixels has a pixel value equal to a sum of luminance values of pixels within an area of a triangle among the second plurality of pixels that has a vertex angle of 90 degrees when the position of each pixel of the original image is set as a vertex thereof and a prescribed side of four sides of the original image is set as a base thereof.

4. The learning device according to claim 1, wherein the circuitry is further configured to store information, which represents the selected feature extraction filters, and information of the same-subject classifiers.

5. A learning method, comprising:
acquiring, using circuitry, a first plurality of image pairs in which same subjects appear and a second plurality of image pairs in which different subjects appear;
setting, using the circuitry, feature points on a first image and a second image of each image pair of the first plurality of image pairs and of the second plurality of image pairs;
selecting, using the circuitry, a plurality of prescribed feature points set at corresponding same positions on the first image and the second image of each image pair of the first plurality of image pairs and of each image pair of the second plurality of image pairs, so as to thereby select feature extraction filters, which are used to extract a feature for each prescribed feature of the prescribed feature points;
extracting, using the circuitry, the feature for each prescribed feature of the prescribed feature points on each of the first image and the second image of each image pair of the first plurality of image pairs and of each image pair of the second plurality of image pairs by using the selected feature extraction filters;
calculating, using the circuitry, a correlation between the extracted features for each image pair of the first plurality of image pairs, and for each image pair of the second plurality of image pairs; and
learning, using the circuitry, same-subject classifiers for identifying whether or not the same subjects appear, on the basis of the calculated correlation and label information representing in which pair of the first plurality of image pairs and of the second plurality of image pairs the same subject appears,
wherein the same-subject classifiers comprise at least one strong classifier and at least one weak classifier, and
wherein the learning further comprises:
  learning, using the circuitry, a same-subject classifier of the same-subject classifiers that is a strong classifier formed of a plurality of weak classifiers, through boosting, and
  randomly selecting, using the circuitry, the prescribed feature points and the feature extraction filters whenever a weak classifier of the plurality of weak classifiers is learned.

6. A non-transitory computer-readable storage medium having a program stored thereon, the program causing a computer to execute a processing comprising:
acquiring, using the computer, a first plurality of image pairs in which same subjects appear and a second plurality of image pairs in which different subjects appear;
setting, using the computer, feature points on a first image and a second image of each image pair of the first plurality of image pairs and of the second plurality of image pairs;
selecting, using the computer, a plurality of prescribed feature points set at corresponding same positions on the first image and the second image of each image pair of the first plurality of image pairs and of each image pair of the second plurality of image pairs, so as to thereby select feature extraction filters, which are used to extract a feature for each prescribed feature of the prescribed feature points;
extracting, using the computer, the feature for each prescribed feature of the prescribed feature points on each of the first image and the second image of each image pair of the first plurality of image pairs and of each image pair of the second plurality of image pairs by using the selected feature extraction filters;

calculating, using the computer, a correlation between the extracted features for each image pair of the first plurality of image pairs, and for each image pair of the second plurality of image pairs; and learning, using the computer, same-subject classifiers for identifying whether or not the same subjects appear, on the basis of the calculated correlation and label information representing in which pair of the first plurality of image pairs and of the second plurality of image pairs the same subject appears, wherein the same-subject classifiers comprise at least one strong classifier and at least one weak classifier, and wherein the learning further comprises:
learning, using the computer, a same-subject classifier of the same-subject classifiers that is a strong classifier formed of a plurality of weak classifiers, through boosting, and randomly selecting, using the computer, the prescribed feature points and the feature extraction filters whenever a weak classifier of the plurality of weak classifiers is learned.

7. An identification device, comprising:
first circuitry configured to store information representing a plurality of feature extraction filters and information of same-subject classifiers generated through learning of a learning device, which comprises second circuitry configured to:
acquire a first plurality of image pairs in which same subjects appear and a second plurality of image pairs in which different subjects appear;
set feature points on a first image and a second image of each image pair of the first plurality of image pairs and of the second plurality of image pairs;
select a plurality of prescribed feature points set at corresponding same positions on the first image and the second image of each image pair of the first plurality of image pairs and of each image pair of the second plurality of image pairs, so as to thereby select the plurality of feature extraction filters, which are used to extract a feature for each prescribed feature of the prescribed feature points;
extract the feature for each prescribed feature of the prescribed feature points on each of the first image and the second image of each image pair of the first plurality of image pairs and of each image pair of the second plurality of image pairs by using the selected feature extraction filters;
calculate a correlation between the extracted features for each image pair of the first plurality of image pairs, and for each image pair of the second plurality of image pairs;
learn same-subject classifiers for identifying whether or not the same subjects appear, on the basis of the calculated correlation and label information representing in which pair of the first plurality of image pairs and of the second plurality of image pairs the same subject appears,
wherein the same-subject classifiers comprise at least one strong classifier and at least one weak classifier, and
wherein the second circuitry is further configured to:
learn a same-subject classifier of the same-subject classifiers that is a strong classifier formed of a plurality of weak classifiers, through boosting, and
randomly select the prescribed feature points and the feature extraction filters whenever a weak classifier of the plurality of weak classifiers is learned;
third circuitry configured to acquire the first plurality of image pairs and the second plurality of image pairs;
fourth circuitry configured to set the feature points on the acquired image pairs;
fifth circuitry configured to extract the features of the respective feature points by using the plurality of feature extraction filters represented by the stored information;
sixth circuitry configured to calculate the correlation between the extracted features for each image pair of the first plurality of image pairs, and for each image pair of the second plurality of image pairs; and
seventh circuitry configured to identify whether or not the same subjects appear in each image pair of the first plurality of image pairs, and in each image pair of the second plurality of image pairs, on the basis of the same-subject classifiers, when the calculated correlation is provided as an input.

8. The identification device according to claim 7, wherein the seventh circuitry is further configured to calculate a sum of scores on the basis of a plurality of weak classifiers constituting the same-subject classifier as a strong classifier, and when the calculated sum is equal to or greater than a threshold value, identify the subjects as the same subjects.

9. An identification method of an identification device according to claim 7, comprising:
acquiring, using the third circuitry, the first plurality of image pairs and the second plurality of image pairs;
setting, using the fourth circuitry, the feature points on the acquired image pairs;
extracting, using the fifth circuitry, the features of the respective feature points by using the plurality of feature extraction filters represented by the stored information;
calculating, using the sixth circuitry, the correlation between the extracted features for each image pair of the first plurality of image pairs, and for each image pair of the second plurality of image pairs; and
identifying, using the seventh circuitry, whether or not the same subjects appear in each image pair of the first plurality of image pairs, and in each image pair of the second plurality of image pairs, on the basis of the same-subject classifiers, when the calculated correlation is provided as an input.

10. A non-transitory computer-readable storage medium having a program stored thereon, the program causing a computer to execute a processing of the identification method according to claim 9.

* * * * *